United States Patent
Fukunaga et al.

(10) Patent No.: US 8,624,846 B2
(45) Date of Patent: Jan. 7, 2014

(54) DISPLAY DEVICE

(75) Inventors: Yoko Fukunaga, Kanagawa (JP);
Tsutomu Tanaka, Kanagawa (JP);
Yasuyuki Matsui, Kanagawa (JP);
Daisuke Takama, Kanagawa (JP)

(73) Assignee: Japan Display West, Inc., Chita (JP)

( * ) Notice: Subject to any disclaimer, the term of this patent is extended or adjusted under 35 U.S.C. 154(b) by 938 days.

(21) Appl. No.: 12/277,062

(22) Filed: Nov. 24, 2008

(65) Prior Publication Data
US 2009/0146992 A1 Jun. 11, 2009

(30) Foreign Application Priority Data
Dec. 5, 2007 (JP) ................................. 2007-315286

(51) Int. Cl.
*G06F 3/041* (2006.01)
(52) U.S. Cl.
USPC ............ 345/173; 345/156; 345/175; 345/179
(58) Field of Classification Search
USPC ........................................................ 345/214
See application file for complete search history.

(56) References Cited

U.S. PATENT DOCUMENTS

| | | | | |
|---|---|---|---|---|
| 5,850,122 | A | * | 12/1998 | Winsor ......................... 313/493 |
| 5,916,735 | A | * | 6/1999 | Nakashima et al. .......... 430/314 |
| 2004/0070551 | A1 | * | 4/2004 | Walck et al. ...................... 345/7 |
| 2006/0244693 | A1 | * | 11/2006 | Yamaguchi et al. ............ 345/76 |

FOREIGN PATENT DOCUMENTS

| | | |
|---|---|---|
| JP | 06-202786 | 7/1994 |
| JP | 2000-066168 | 3/2000 |
| JP | 2000-098917 | 4/2000 |
| JP | 2001-360143 | 12/2001 |
| JP | 2006-227907 | 8/2006 |

* cited by examiner

*Primary Examiner* — Quan-Zhen Wang
*Assistant Examiner* — David Lee
(74) *Attorney, Agent, or Firm* — Robert J. Depke; The Chicago Technology Law Group, LLC

(57) ABSTRACT

Disclosed herein is a display device including, a display section having a display surface, and capable of displaying information on the display surface, and a light storing section capable of receiving incident light including visible light, absorbing a part of the incident light, and outputting the part of the incident light as an afterglow including non-visible light, wherein a light sensor configured to detect an object to be detected on a side of the display surface on a basis of a non-visible light component of output light from the light storing section is disposed within the display section.

11 Claims, 16 Drawing Sheets

100

F I G . 6
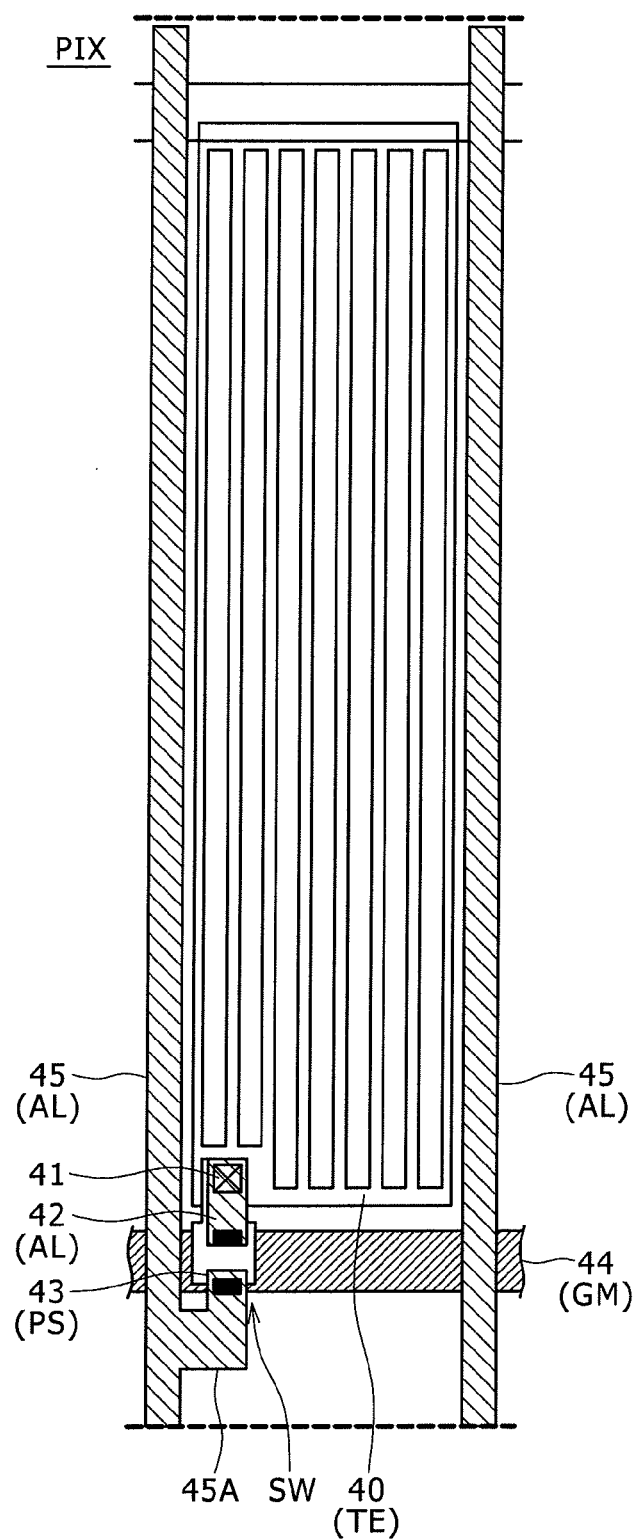

NOT APPLIED

APPLIED

DISPLAY DEVICE

CROSS REFERENCES TO RELATED APPLICATIONS

The present invention contains subject matter related to Japanese Patent Application JP 2007-315286 filed in the Japan Patent Office on Dec. 5, 2007, the entire contents of which being incorporated herein by reference.

BACKGROUND OF THE INVENTION

1. Field of the Invention

The present invention relates to a display device that has a display surface and which can display information such as an image, a character and the like on the display surface, and particularly to a display device configured to be able to detect an object to be detected in contact with or in proximity to a display surface.

2. Description of the Related Art

Liquid crystal display devices, organic EL (Electro Luminescence) display devices, and display devices using electrophoresis are known as display devices capable of displaying information such as an image, a character and the like.

With decreases in thickness of the display devices, the display devices are desired to become multifunctional combining an original function of displaying video and text information and the like and a function of an input device or the like to which a user designation or the like is input. A display device detecting that a finger of a user or a stylus pen (so-called touch pen or the like) has come into contact with or into proximity to a display surface is known as a display device that meets this desire.

Contact detection can be performed by a resistive film type or a capacitance type touch panel. A display device having a touch panel added to the display surface side of a display panel such as a liquid crystal panel or the like is known.

However, the addition of the touch panel is disadvantageous for reduction in thickness of the display panel, and is a factor in increasing cost. The resistive film type touch panel, in particular, cannot detect a change in resistance value unless a screen is pushed with a certain degree of force, so that a display surface is distorted. In addition, the resistive film type touch panel performs one-point detection in principle, and thus has limited uses.

A display device having an optical position detecting function by including a light receiving element for indicated position detection in a display panel is known as an indicated position detecting system that does not require a touch panel (see Japanese Patent Laid-Open No. 2005-275644 and Japanese Patent Laid-Open No. 2006-301864, hereinafter referred to as Patent Documents 1 and 2 respectively).

A system that detects the shadow of extraneous light by a light receiving element is widely used in optical position detection.

On the other hand, a display device described in Patent Document 2 includes a light receiving element (hereinafter referred to as a light sensor) having sensitivity to non-visible light within a liquid crystal (or an organic EL) display panel. In the case of the liquid crystal display panel, a backlight is disposed on one principal plane (rear) side of the liquid crystal display panel. Light from the backlight includes a visible light component and a non-visible light component. The light from the backlight undergoes modulation according to an input video signal in a liquid crystal layer when passing through the liquid crystal display panel, and is then emitted from another principal plane (a front or a display surface). A predetermined image is displayed by modulating the visible light component of the emitted light (outgoing light).

When there is an object (that is a finger of a human, a stylus pen, or the like, and which will hereinafter be referred to as an object to be detected) in contact with or in proximity to the display surface side of the liquid crystal display panel, a part of the emitted light is reflected by the object to be detected, and is then guided as reflected light to the side of the light sensor. The light sensor detects a non-visible light component, in particular, of the reflected light from the object to be detected. A visible light blocking (non-visible light selecting) filter is provided so as to correspond to a region where the light sensor is disposed, and the transmitted light does not undergo modulation according to a video signal in the region. Therefore the detection of the object to be detected can be performed without affecting a display state and without being affected by a degree of brightness of surroundings. The position and size of the object to be detected can be detected by arranging a large number of light sensors regularly (discretely and two-dimensionally).

The organic EL display device does not need a backlight. Pixels themselves emit light in the organic EL display device. In this case, non-visible light emitting elements and light receiving elements are arranged at predetermined intervals within the display region of a panel. A method itself of detecting an object to be detected is similar to that of the above-described liquid crystal display device. Non-visible light from the light emitting elements is reflected by the object to be detected. By detecting difference between amounts of reflected light at this time by the plurality of light receiving elements arranged discretely and two-dimensionally, the position and size of the object to be detected can be detected.

A display device described in Patent Document 1 includes a light sensor on the backlight side of a spacer separating a liquid crystal layer for each pixel. A region within a pixel which region is different from the region where the light sensor is disposed includes a region configured to dispose a light receiving element (hereinafter referred to as a visible light sensor) having sensitivity to visible light and a region that can change voltage applied to the liquid crystal layer and thus modulate transmitted light according to a video signal (which region will hereinafter be referred to as a light modulating region).

The display device described in Patent Document 1 is configured to be able to detect both the visible light component and the non-visible light component of light reflected by an object to be detected such as a finger of a human, a stylus pen or the like.

According to the techniques described in Patent Documents 1 and 2, object detection is performed using non-visible light, which is invisible to the human eye and thus does not affect displayed video. Thus, in a case where an amount of transmitted light of visible light which transmitted light passes from a rear side to a front side is substantially close to zero as in black screen display, display is not affected even when non-visible light is passed to the front side. Therefore an object to be detected can be detected even at a time of black display. The object can be detected regardless of whether surroundings are dark or bright.

[Non-Patent Document 1]
S. Klein et al. Journal of Applied Physics 98, 24905, (2005)
[Non-Patent Document 2]
K. H. Jun et al. Physical Review B 66, 15301, (2002)

SUMMARY OF THE INVENTION

However, although the display devices as described in Patent Documents 1 and 2, for example, distribute power for processing and perform operation for information display, information input or designating operation by a finger, a stylus pen or the like cannot be performed after an illumination power supply for the backlight or the like is turned off. In a case of a light transmissive type or a light reflective type display device having an illuminating section, for example, an illumination power supply can be accidentally turned off while the display device is being used in a totally dark environment. In such a case, it is convenient if information input or designating operation by a finger, a stylus pen or the like can be performed for a while after the illumination power supply is turned off.

In addition, a display device for use in a mobile device or the like may be changed to a power saving mode when no operation is performed for a predetermined time, and an illumination power supply may be turned off automatically. In this case, when a user desires to resume operation, the user touches a position on a display surface to cancel the power saving mode, and then resumes operation.

However, when the illumination power supply is turned off in a completely dark environment, an operation of touching the position on the display surface needs to be performed by feeling, so that usability is poor.

On the other hand, an emissive type display device causes an inconvenience in that when the display device is suddenly moved to a bright environment during use at a very low light emission intensity in a dark environment, it becomes momentarily difficult to see the screen, and an operation such as information input, designation or the like is forced to be stopped. This inconvenience is common to the light transmissive type and light reflective type display devices.

The present invention proposes a novel display device that enables information input and designation by a finger, a stylus pen or the like (object to be detected) even when a correspondence between the brightness of a surrounding environment and the brightness of a display surface changes suddenly.

A display device according to an embodiment (first embodiment) of the present invention includes: a display section having a display surface, and capable of displaying information on the display surface; and a light storing section capable of receiving incident light including visible light, absorbing a part of the incident light, and outputting the part of the incident light as an afterglow including non-visible light; wherein a light sensor configured to detect an object to be detected on a side of the display surface on a basis of a non-visible light component of output light from the light storing section is disposed within the display section.

According to another embodiment (second embodiment) of the present invention, in the display device according to the first embodiment, the light storing section is disposed within the display section.

In a display device according to another embodiment (third embodiment) of the present invention, in addition to the above-described second embodiment, further, the display section includes an illuminating section configured to produce illuminating light including visible light, the light storing section formed by a light storing material, and capable of absorbing a part of the illuminating light, outputting remaining illuminating light other than the absorbed part of the illuminating light, and outputting the absorbed part of the illuminating light as an afterglow including non-visible light, a light modulating section configured to receive output light incident on the light modulating section from the light storing section, modulate the incident output light according to an input signal, and emit the modulated output light, the display surface emitting, to an outside, the output light having the information added to the output light by being modulated by the light modulating section, and the light sensor configured to detect non-visible light from reflected light resulting from the output light being reflected by the object to be detected on the side of the display surface.

In a display device according to another embodiment (fourth embodiment) of the present invention, in addition to the above-described third embodiment, further, the illuminating section includes a light source and a light guide plate configured to convert light from the light source into the illuminating light in a plane shape, the illuminating section is disposed on an anti-display surface side of the display section, and the light storing section is formed between a side of the illuminating section and the light modulating section.

In a display device according to another embodiment (fifth embodiment) of the present invention, in addition to the above-described second embodiment, further, the display section includes the display surface, the light storing section formed by a light storing material, and capable of absorbing a part of extraneous light incident on the light storing section from the display surface, outputting remaining extraneous light, and outputting the absorbed part of the extraneous light as an afterglow including non-visible light, a reflecting surface for reflecting output light from the light storing section to emit the output light from the display surface to an outside, a light modulating section configured to modulate the output light according to an input signal in an optical path in a mid course of the output light from the light storing section being reflected by the reflecting surface and emitted from the display surface, and the light sensor configured to detect non-visible light from reflected light resulting from the output light from the light storing section being reflected by the object to be detected on the side of the display surface.

In a display device according to another embodiment (sixth embodiment) of the present invention, in addition to the above-described second embodiment, further, in the display section, a plurality of pixel regions configured to dispose a pixel and a plurality of sensor regions configured to dispose the light sensor are determined regularly as viewed from the display surface, and the light storing section is formed in each of the pixel regions.

In a display device according to another embodiment (seventh embodiment) of the present invention, in addition to the above-described sixth embodiment, further, the non-visible light is infrared light, the light sensor is an infrared light sensor having sensitivity to the infrared light, and the light storing section is formed by making a red light transmitting filter contain a light storing material.

In a display device according to another embodiment (eighth embodiment) of the present invention, in addition to the above-described second embodiment, further, in the display section, a plurality of pixel regions configured to dispose a pixel and a plurality of sensor regions configured to dispose the light sensor are determined regularly as viewed from the display surface, and the light storing section is formed in each of the sensor regions.

In addition to the above-described first embodiment, further, a display device according to another embodiment (ninth embodiment) of the present invention includes a stylus pen having the light storing section in a region including a tip as an accessory.

In a display device according to another embodiment (tenth embodiment) of the present invention, in addition to the above-described ninth embodiment, further, the display section includes an illuminating section configured to produce illuminating light including visible light, a light modulating section configured to receive the illuminating light incident on the light modulating section, modulate the incident illuminating light according to an input signal, and emit the modulated illuminating light, and the display surface for emitting the illuminating light modulated by the light modulating section to an outside.

According to the foregoing first to tenth embodiments, the display device has a light storing section. When light including ultraviolet to visible light, for example, is made incident on the light storing section, the light storing section can for example absorb a part of the incident light including the ultraviolet to visible light and temporarily retain the part of the incident light. The remaining incident light is emitted as it is. The absorbed light becomes an afterglow including non-visible light. That is, the afterglow can be output from the light storing section for a while even after supply of light energy is stopped.

The object to be detected can be detected on the basis of output light from the light storing section.

For example, when the object to be detected comes into contact with or into proximity to the display surface side of the display section configured to display information, the output light from the light storing section is input to the light sensor within the display section. The output light made incident on the light sensor includes a non-visible light component. The light sensor detects the object to be detected on the basis of the non-visible light component.

The light storing section has a light storing function, and thus outputs light (that is generally "fluorescence" or "phosphorescence," and which will hereinafter be referred to as an "afterglow") for a while even after the incidence of light is stopped. This afterglow includes non-visible light. Thus, the position, size and the like of the object to be detected can be detected by the light sensor for a while even after supply of light energy is stopped.

In addition, because of the afterglow from the light storing section, the light storing section glows so as to be visible to the eye even after supply of light energy is stopped, for example after an illumination power supply is turned off. This light can be used as illuminating light for illuminating the display section.

The light storing section is provided within the display section (second embodiment) or the stylus pen (ninth embodiment).

In the second embodiment, the display section includes an illuminating section, a light storing section, a light modulating section, a display surface, and a light sensor (third embodiment). In this embodiment, the light storing section acts to supply non-visible light to the light sensor on the basis of illuminating light from the illuminating section, and also acts as an auxiliary light source for the illuminating section. It is therefore possible to detect the position, size and the like of the object to be detected and display information for a while even after power supply to the illuminating section is stopped.

As a concrete example of arrangement of the third embodiment, the fourth embodiment presents an example of arrangement in which the illuminating section functions as a backlight. In this case, the light storing section is formed between the light emitting surface of a light guide plate of the illuminating section and the light modulating section. Thus, the light storing section receives illuminating light in a plane shape. While the illuminating section is lit, the light storing section stores a part of the illuminating light, and supplies the other light as light to be modulated on the side of the display section. After power to the illuminating section is turned off, light from the light storing section is used as light for detection of the position, size and the like of the object to be detected and as auxiliary illuminating light.

On the other hand, a so-called front light disposition of the illuminating section is possible as another concrete example of arrangement of the third embodiment (fifth embodiment). In this case, the display section includes a display surface, a light storing section, a reflecting surface, a light modulating section, and a light sensor. Whether to provide an illuminating section or not is determined arbitrarily. Because an amount of light stored by a light storing material is limited, all of output light from the light storing section is used as light to be modulated after a part of extraneous light is stored. The output light from the light storing section undergoes modulation by the light modulating section in a process of being reflected by the reflecting surface and returning to the side of the display surface, so that information is added to the output light. Hence, the information can be displayed from the display surface. Meanwhile, a non-visible light component of the output light from the light storing section is used for detection of the position, size and the like of the object to be detected.

In the front light disposition, the reflecting surface can be positioned on the rear side of the light modulating section, and the light storing section and the display surface can be positioned on the front side. Therefore extraneous light is easily made incident on the light storing section. In addition, the light storing section and the light sensor can be disposed in close vicinity to the display surface. Hence, even when an amount of output non-visible light is small, the object to be detected is surely detected by the light sensor.

The sixth embodiment and the eighth embodiment present an example of arrangement as viewed from the display surface of the light storing section. The seventh embodiment presents a concrete example in which the function of the light storing section in the sixth embodiment is provided to a so-called color filter.

The ninth embodiment and the tenth embodiment illustrate a case where the light storing section is formed at the part of a pen tip of a stylus pen.

According to the present invention, it is possible to provide a display device that enables information input and designation by a finger, a stylus pen or the like (object to be detected) even when a correspondence between the brightness of a surrounding environment and the brightness of a display surface changes suddenly.

BRIEF DESCRIPTION OF THE DRAWINGS

FIG. 6 is a plan view of a TFT array substrate part corresponding to a pixel according to the embodiment of the present invention;

DETAILED DESCRIPTION OF THE PREFERRED EMBODIMENTS

Preferred embodiments of the present invention will hereinafter be described with reference to the drawings by taking a liquid crystal display device capable of detecting the position, size, and the like of an object to be detected by infrared (IR) light as an example. Incidentally, while the detection of the position, size, and the like of an object to be detected is performed on the basis of non-visible light in the present invention, detection based on IR light will be principally illustrated in embodiments. The detection of the position, size, and the like of an object to be detected can be performed also on the basis of non-visible light other than IR light, as will be described later.

First Embodiment

The present embodiment relates to a transmissive type liquid crystal display device having a backlight.

Figure 1:
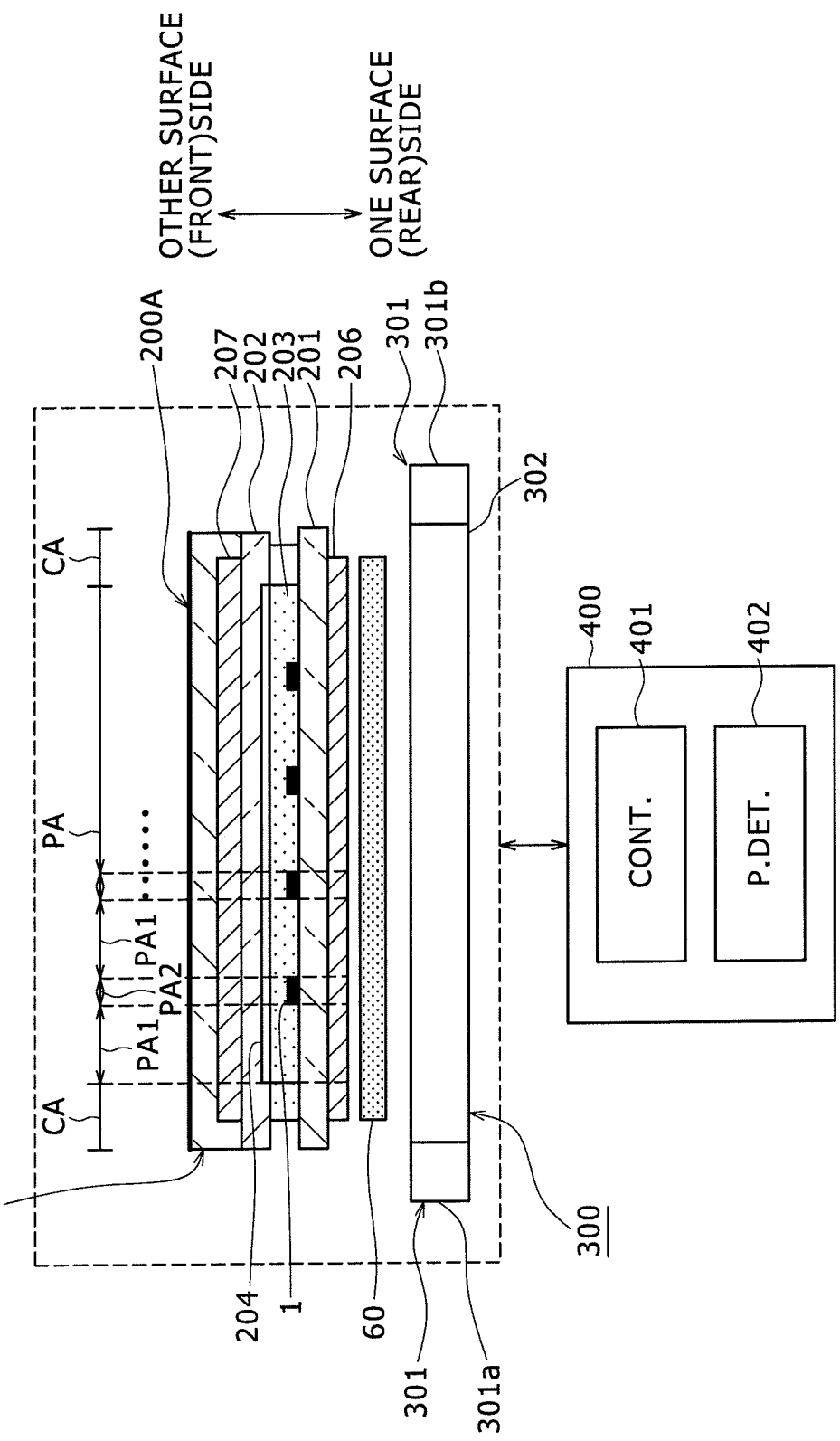
FIG. 1 is a schematic diagram of general constitution of a transmissive type liquid crystal display device according to a first embodiment of the present invention.

FIG. 1 is a schematic diagram of general constitution of the transmissive type liquid crystal display device.

The liquid crystal display device 100 illustrated in FIG. 1 includes a liquid crystal panel 200 as a "display section," a backlight 300 as an "illuminating section," a data processing section 400, and a light storing section 60.

One of the features of the liquid crystal display device 100 is that the liquid crystal display device 100 has the light storing section 60. The light storing section 60 is a photoluminescent member that stores light within a material and which continues emitting light even after supply of light energy is stopped, that is, emits an "afterglow."

The light storing section 60 is formed so as to be able to receive light incident on the light storing section 60 which light includes ultraviolet to visible light, for example, absorb a part of the incident light, and output an "afterglow" including visible light and non-visible light. While the light storing section 60 may be disposed in a dispersed manner within the liquid crystal panel 200, the light storing section 60 in FIG. 1 is formed as for example a sheet-shaped constitution separate from the other constitution. In the example of FIG. 1, the light storing section 60 is formed between the liquid crystal panel 200 and the backlight 300. The light storing section 60 may be formed in the liquid crystal panel 200, or may be formed in the backlight 300.

A material for light storage in which the light storing section 60 produces an "afterglow" from incident light and more detailed action and effect of the light storing section 60 will be described later.

As shown in FIG. 1, the liquid crystal panel 200 includes a TFT array substrate 201, a color filter substrate (hereinafter referred to as a CF substrate) 202 as a so-called "counter substrate," and a liquid crystal layer 203. With the liquid crystal layer 203 as a center, the side of the backlight 300 in a direction of thickness of the liquid crystal panel 200 will be referred to as "one surface side" or a "rear side," and the side opposite to the one surface side will be referred to as an "other surface side" or a "front side."

The TFT array substrate 201 and the CF substrate 202 face each other at an interval. The liquid crystal layer 203 is formed in such a manner as to be sandwiched between the TFT array substrate 201 and the CF substrate 202. Though not shown specifically in FIG. 1, a pair of alignment films for aligning a direction of arrangement of liquid crystal molecules in the liquid crystal layer 203 is formed so as to sandwich the liquid crystal layer 203.

A color filter 204 is formed in the surface of the CF substrate 202 on the side of the liquid crystal layer 203.

A first polarizer 206 and a second polarizer 207 are placed so as to face each other on both sides of the liquid crystal panel 200. The first polarizer 206 is disposed on the rear side of the TFT array substrate 201. The second polarizer 207 is disposed on the front side of the CF substrate 202.

As shown in FIG. 1, a light sensor section 1 having a "light sensor" is provided on the other surface side of the TFT array substrate 201 facing the liquid crystal layer 203. As will be described later in detail, the light sensor section 1 includes a light receiving element as a "light sensor" and a readout circuit for the light receiving element.

The light sensor section 1 is formed to provide a function of a so-called touch panel to the inside of the liquid crystal panel 200. When the liquid crystal panel 200 is viewed from the side of a display surface 200A (front side), light sensor sections 1 are regularly arranged within an effective display region PA.

FIG. 1 shows a section of the liquid crystal panel 200 including the light sensor sections 1 arranged in the form of a matrix in the effective display region PA. In FIG. 1, a plurality of light sensor sections 1 (only five light sensor sections 1 are shown) are arranged at equal intervals. The number of light sensor sections 1 in one direction needs to be sufficiently larger than five for a purpose of position detection. The number of light sensor sections 1 in FIG. 1 is reduced to five for convenience of illustration. When the function of position detection is limited to a part of the effective display region PA, light sensor sections 1 are arranged regularly in the limited display region.

Regions of the liquid crystal panel 200 in which regions a light sensor section 1 is formed as shown in FIG. 1 as viewed from the effective display region PA of the display surface 200A will be defined as "sensor regions (PA2)," and other regions of the liquid crystal panel 200 will be defined as "pixel regions (PA1)." Incidentally, these regions are three-dimensional regions including the direction of thickness of the panel.

The pixel regions (PA1) are pixel arranging regions in which a plurality of colors such as red (R), green (G), and blue (B), for example, are assigned to each pixel. The color assignment is determined by the transmission wavelength characteristic of a color filter opposed to the pixel.

Though not shown in FIG. 1, a pixel electrode and a common electrode (referred to also as a counter electrode) are formed in a pixel arranging region (pixel region (PA1)). The pixel electrode and the common electrode are formed by a transparent electrode material. A common electrode common to all pixels may be formed so as to be opposed to pixel electrodes on an anti-liquid crystal layer side of the pixel electrodes on the other surface side (liquid crystal layer side) of the TFT array substrate 201. Alternatively, the pixel electrodes may be formed on the other surface side of the TFT array substrate 201, and the common electrode may be formed as electrode common to all the pixels at a position on the side of the CF substrate 202, with the liquid crystal layer 203 interposed between the pixel electrodes and the common electrode.

Though not shown in FIG. 1, an auxiliary capacitance auxiliary to a liquid crystal capacitance between the pixel electrode and the counter electrode, a switching element for controlling a potential applied to the pixel electrode according to the potential of an input video signal, and the like are also formed in the pixel arranging region according to a pixel configuration.

One mode of a "light modulating section" is formed by including the pixel electrode, the counter electrode, the liquid crystal layer 203, and the auxiliary capacitance and the switching element.

Supposing that a unit formed by a plurality of pixels each corresponding to one of a plurality of colors is a "pixel unit," the arrangement density of light sensor sections 1 is at a maximum when a ratio of the light sensor sections 1 to pixel units is 1:1. The arrangement density of the light sensor sections 1 in the present embodiment may be at the above-described maximum, or may be lower.

The backlight 300 is disposed on the rear side of the TFT array substrate 201. The backlight 300 faces the rear side of the liquid crystal panel 200, and emits illuminating light to the effective display region PA of the liquid crystal panel 200.

The backlight 300 illustrated in FIG. 1 has a light source 301 and a light guide plate 302 for converting light emitted from the light source 301 into plane-shaped light by diffusing the light emitted from the light source 301. The backlight 300 includes a direct backlight and a side backlight according to the disposed position of the light source 301 with respect to the light guide plate 302. In this case, however, a side backlight is illustrated.

The light source 301 is disposed in the rear of the liquid crystal panel 200 and on one side or both sides in a direction along the rear of the liquid crystal panel 200. In other words, the light source 301 is disposed along one side or two opposed sides of the liquid crystal panel 200 as viewed from the display surface 200A (front side). However, the light source 301 may be disposed along three or more sides of the liquid crystal panel 200.

The light source 301 is for example formed by a cold-cathode tube lamp. Specifically, the light source 301 converts ultraviolet rays produced by an arc discharge in a low-pressure mercury vapor within a glass tube into visible light by a phosphor, and radiates the visible light. Incidentally, the light source 301 is not limited to a cold-cathode tube lamp, but may be formed by an LED or an EL element, for example.

In this case, the light source 301 is formed by an LED. FIG. 1 illustrates a case where a visible light source 301a such as a white LED or the like and an IR light source 301b are arranged along two opposed sides.

The light guide plate 302 is for example formed by a translucent acrylic plate. The light guide plate 302 guides light from the light source 301 along surfaces (from one side to another side in the direction along the rear of the liquid crystal panel 200) while effecting total reflection of the light. The rear of the light guide plate 302 is for example provided with a dot pattern not shown in the figure (a plurality of projecting parts) which dot pattern is formed integrally with the light guide plate 302 or formed by a member separate from the light guide plate 302. The guided light is scattered by the dot pattern, and emitted to the liquid crystal panel 200. Incidentally, a reflecting sheet for reflecting light may be provided on the rear side of the light guide plate 302, and a diffusing sheet or a prism sheet may be provided on the front side of the light guide plate 302.

Because the backlight 300 has the above constitution, the backlight 300 irradiates the entire surface of the effective display region PA of the liquid crystal panel 200 with substantially uniform plane light.

<Assembly of Liquid Crystal Display Device>

Figure 2:
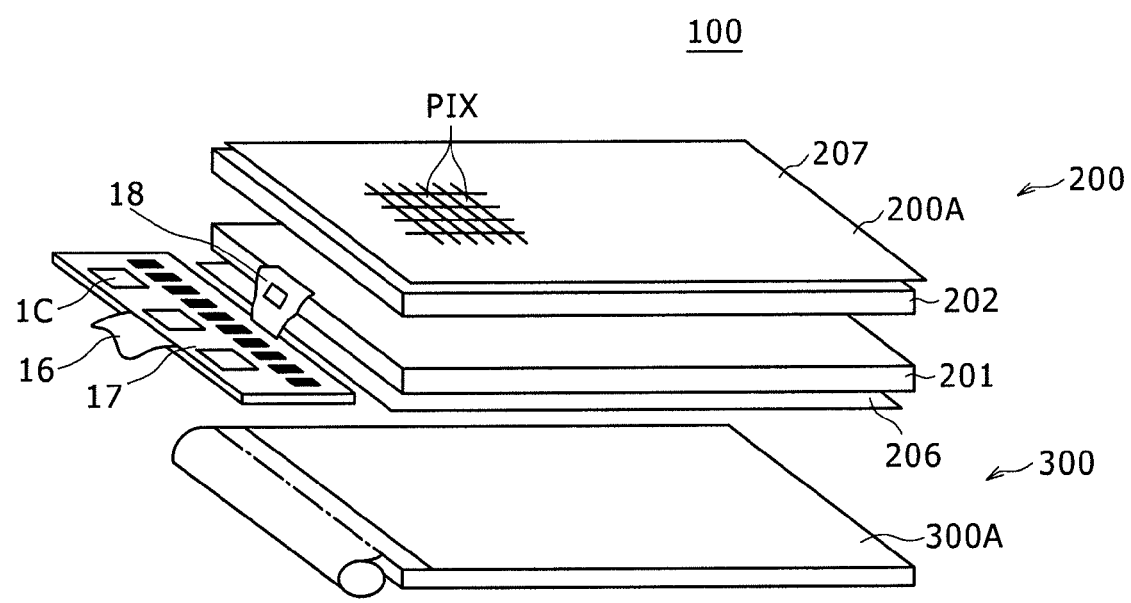
FIG. 2 is an exploded perspective view of the constitution shown in FIG. 1.

FIG. 2 is an exploded perspective view of the constitution shown in FIG. 1.

A pixel circuit, a sensor readout circuit, and the like are formed on the other surface side of the TFT array substrate 201 of the liquid crystal panel 200, and thereafter an alignment film and a spacer (not shown) are formed on the same surface. A color filter 204 (see FIG. 1) and an alignment film (not shown) are formed on the one surface side of the CF substrate 202. The two substrates are laminated to each other such that the surface side on which the color filter 204 and the alignment film are formed faces the other surface side of the TFT array substrate 201. Thereafter, a liquid crystal is sealed in a space between the opposed substrates which space is formed by the spacer. The first polarizer 206 is disposed on the one surface side of the TFT array substrate 201. The second polarizer 207 is disposed on the other surface side of the CF substrate 202.

A circuit board 17 is electrically connected to the liquid crystal panel 200 via a connector 18. A plurality of ICs and the like that for example output an electric signal for displaying an image on the liquid crystal panel 200 to the liquid crystal panel 200 or to which an electric signal for detecting a user operation on the display surface 200A is input from the liquid crystal panel 200 are mounted on the circuit board 17 in advance. The ICs include a control section (CPU). A flexible board 16 for connection to a mother board of a device in which to mount the liquid crystal display device 100 is provided to the circuit board 17.

<Circuit Configuration of Liquid Crystal Panel>

Figure 3:
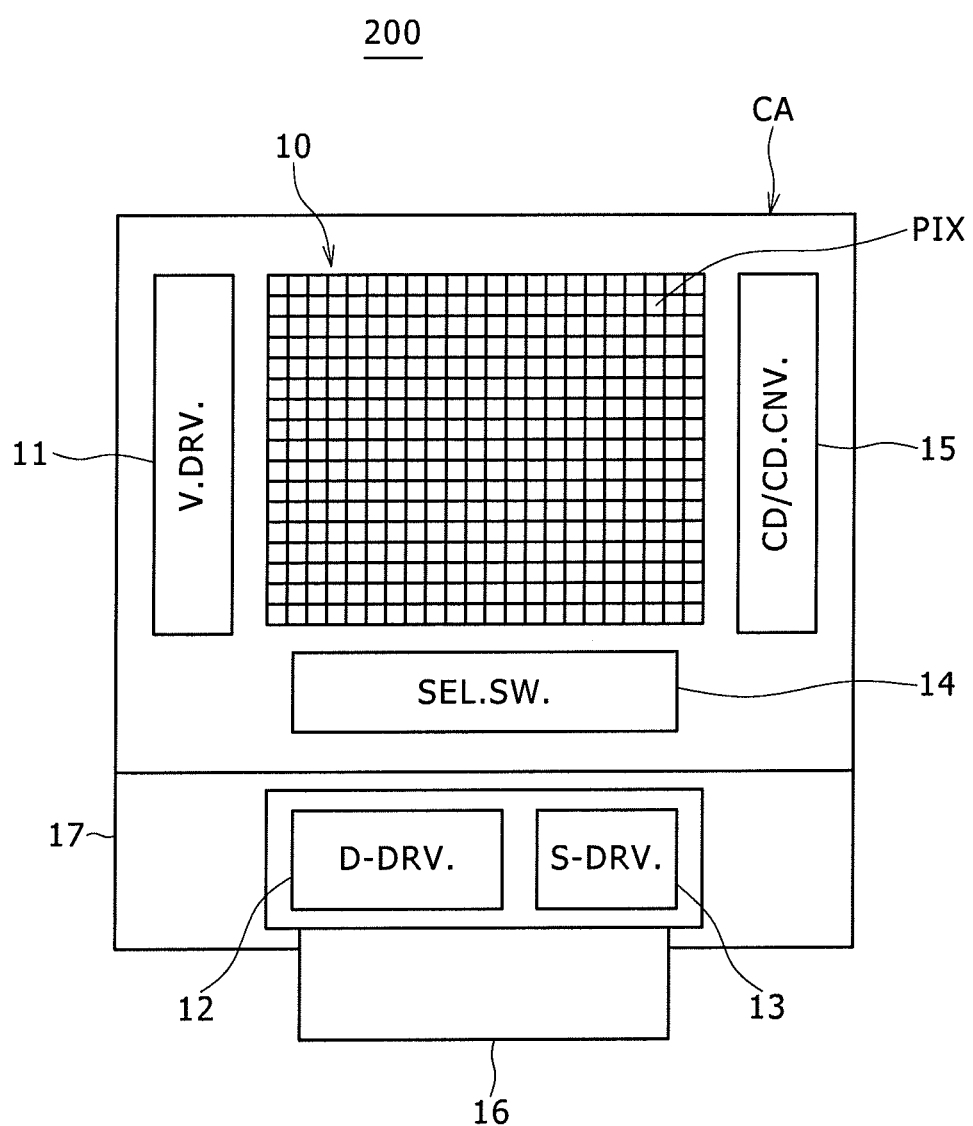
FIG. 3 is a block diagram showing an example of configuration of a driving circuit within a liquid crystal panel according to the embodiment of the present invention.

FIG. 3 is a block diagram showing an example of configuration of a driving circuit within the liquid crystal panel.

As shown in FIG. 3, the liquid crystal panel 200 has a display section 10 in which pixels (PIX) are arranged in the form of a matrix. The display section 10 is a three-dimensional part of the liquid crystal panel 200 including the direction of thickness of the panel.

As shown also in FIG. 1, there is a peripheral region CA around the effective display region PA. The peripheral region CA refers to a region other than the effective display region PA of the TFT array substrate 201. As shown in FIG. 3, a driving circuit represented by several functional blocks that include TFTs formed en bloc together with TFTs within the effective display region PA is formed in the peripheral region CA.

The liquid crystal panel 200 has, as a driving circuit, a vertical driver (V.DRV.) 11, a display driver (D-DRV.) 12, a sensor driver (S-DRV.) 13, a selection switch array (SEL.SW.) 14, and a DC/DC converter (DC/DC.CNV.) 15.

The vertical driver 11 is a circuit having a function of a shift register or the like that scans, in a vertical direction, various control lines arranged in a horizontal direction in order to select pixel lines.

The display driver 12 is a circuit having functions of for example sampling the data potential of a video signal, generating a data signal amplitude, and discharging the data signal amplitude to a signal line common to pixels in a column direction.

The sensor driver 13 is a circuit that scans control lines as with the vertical driver 11 for the light sensor sections 1 arranged in a dispersed manner at a predetermined density within pixel arranging regions and which collects sensor output (detection data) from the light sensor sections 1 in synchronism with the scanning of the control lines.

The switch array 14 is formed by a plurality of TFTs. The switch array 14 is a circuit that controls the discharge of the data signal amplitude by the display driver 12 and which controls the sensor output from the display section 10.

The DC/DC converter 15 is a circuit that generates various direct-current voltages at potentials necessary to drive the liquid crystal panel 200 from input power supply voltage.

Exchanges of input and output signals of the display driver 12 and the sensor driver 13 and other signals between the inside and the outside of the liquid crystal panel 200 are performed via the flexible board 16 (see FIG. 2) provided to the liquid crystal panel 200.

Incidentally, a liquid crystal driving IC (corresponding to the display driver 12), an IC (corresponding to the sensor driver 13 and the like) for driving the sensors and reading the sensor output, and an image processing IC may be SOG-mounted inside the liquid crystal panel 200. The IC for driving the sensors and reading the sensor output and the image processing IC may be integrated into one IC. In this case, exchanges of the above-described input and output signals and the like between the ICs are performed via an SOG mounting terminal within the liquid crystal panel 200.

In addition to the circuits shown in FIG. 3, a constitution for generating a clock signal or external input, for example, is included in the driving circuit.

<Example of Combination Between Pixels and Light Sensor Sections>

As described above, the pixels and the light sensor sections are arranged regularly within the effective display region PA. While the rule of the arrangement is arbitrary, it is desirable to combine a plurality of pixels and one light sensor section into a set, and arrange such sets in the form of a matrix within the effective display region PA.

Description in the following will be made of an example of arrangement in which three pixels of R, G, and B and one light sensor section 1 form one set.

The color filter 204 shown in FIG. 1 substantially corresponds in size to the pixels (PIX) in a plan view. The color filter 204 has filters that selectively transmit the respective wavelength regions of R, G, and B and a black matrix that shields the periphery of the filters (all boundary parts) with a fixed width in order to prevent a color mixture.

Figure 4:
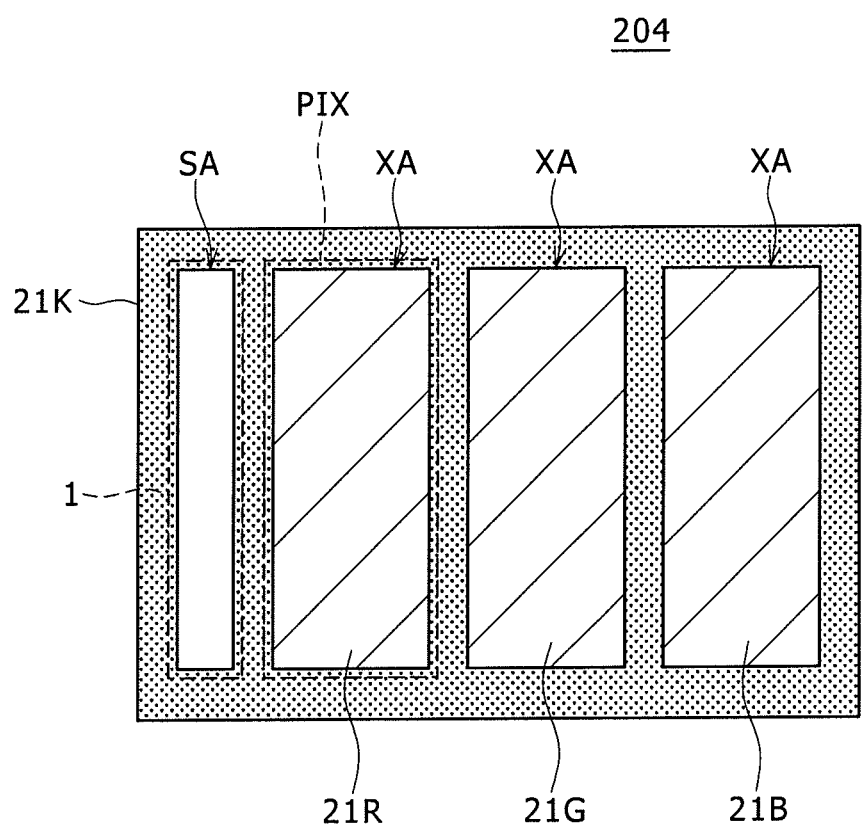
FIG. 4 is a plan view of an example of a pattern of a black matrix according to the embodiment of the present invention.

FIG. 4 shows an example of a pattern of the black matrix. The black matrix 21K illustrated in FIG. 4 forms four openings according to the pattern of the black matrix 21K.

The filters of the three colors are disposed in three pixel openings XA of the four openings.

More specifically, a red filter 21R, a green filter 21G, and a blue filter 21B are arranged in this order in one direction. The red filter 21R and the green filter 21G are separated from each other via the black matrix 21K having a fixed width, and the green filter 21G and the blue filter 21B are separated from each other via the black matrix 21K having the fixed width. Because the three filters are disposed on a same pixel line, the three filters have a fixed height (size in a vertical direction).

The light sensor section 1 having the same height as the pixels (PIX) is disposed on the side of the red filter 21R or the side of the blue filter 21B (on the side of the red filter 21R in this case). In FIG. 4, no filter is formed at the sensor opening SA of the black matrix in the light sensor section 1. This is because light reflected from an object to be detected such as a finger of a human or the like needs to be passed through. When detected light is IR light, an IR filter selectively transmitting IR light may be disposed at the opening of the light sensor section 1.

Incidentally, the black matrix 21K is not an essential constitution. Filters of three colors may be arranged two-dimensionally so as to overlap one another, and a part where the three colors all overlap one another may be used as a light shielding layer in place of the black matrix 21K.

A "black filter" that blocks visible light and transmits non-visible light (IR light) may be provided at the sensor opening SA.

<Pixel Section and Light Sensor Section>

Figure 5A:
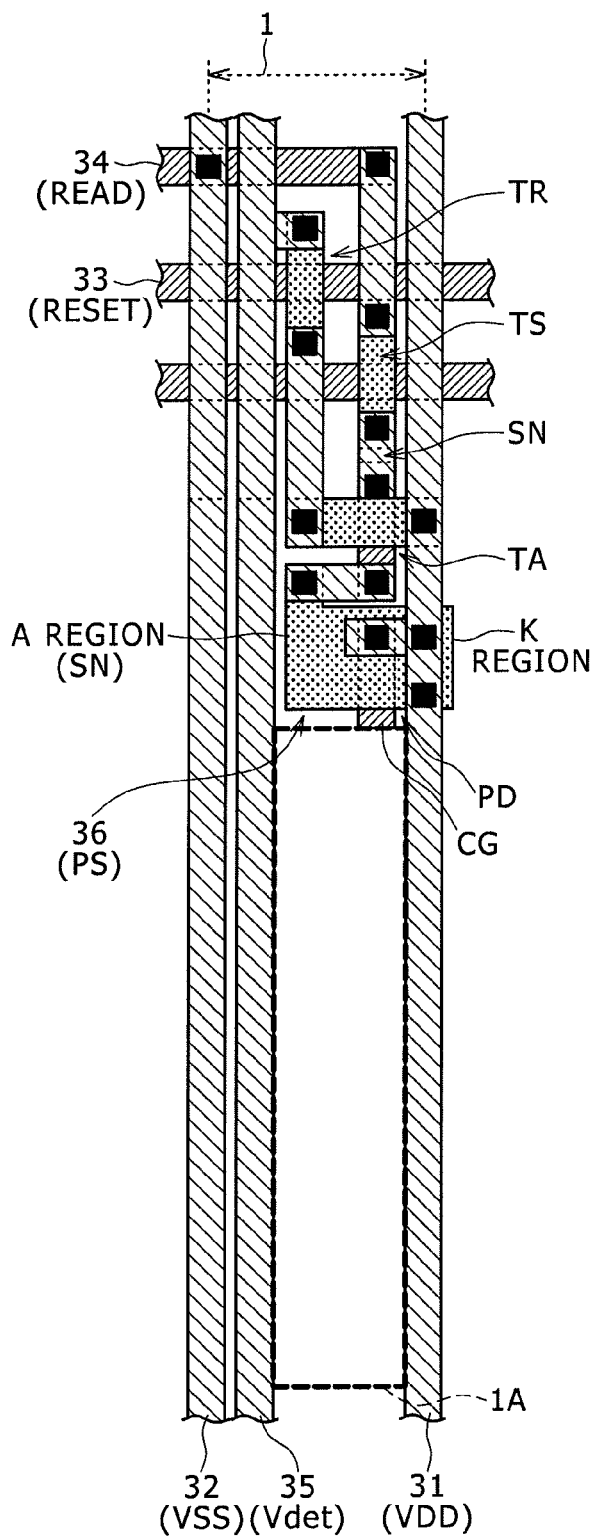
FIGS. 5A and 5B relate to the embodiment of the present invention, FIG. 5A being a plan view of a light sensor section, and FIG. 5B being a diagram of an equivalent circuit of the light sensor section corresponding to the pattern of FIG. 5A.
Figure 5B:
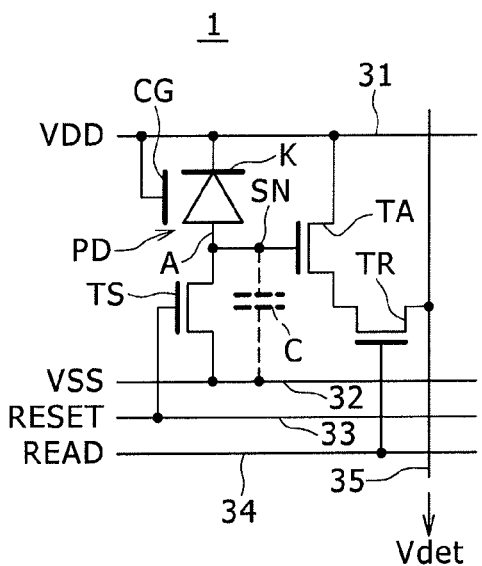

FIG. 5A is an example of a plan view of the light sensor section 1. FIG. 5B shows an example of an equivalent circuit of the light sensor section 1 corresponding to the pattern of FIG. 5A.

The light sensor section 1 illustrated in FIG. 5B has three transistors (N-channel type TFTs in this case) and a photodiode PD.

The three transistors are a reset transistor TS, an amplifier transistor TA, and a readout transistor TR.

The photodiode PD is an example of a "light sensor." The photodiode PD has an anode connected to a storage node SN, and has a cathode connected to a line 31 supplying power supply voltage VDD (which line will hereinafter be referred to as a VDD line). As will be described later, the photodiode PD has a PIN structure or a PDN structure, and has a control gate CG that applies an electric field to an I (intrinsic) region (intrinsic semiconductor region of the PIN structure) or a D (doped) region ($N^-$ region of the PDN structure) via an insulating film. The photodiode PD is used in a reverse-biased state, and has a structure that allows sensitivity of the photodiode PD to be optimized (normally maximized) by controlling a degree of depletion at that time by the control gate CG.

The reset transistor TS has a drain connected to the storage node SN, a source connected to a line 32 supplying reference voltage VSS (which line will hereinafter be referred to as a VSS line), and a gate connected to a line 33 supplying a reset signal (RESET) (which line will hereinafter be referred to as a reset line). The reset transistor TS changes the storage node SN from a floating state to a state of connection to the VSS line 32, discharges the storage node SN, and thereby resets an amount of accumulated charge of the storage node SN.

The amplifier transistor TA has a drain connected to the VDD line 31, a source connected to a line 35 for outputting a detection potential Vdet (or a detection current Idet) (which line will hereinafter be referred to as a detection line) via the readout transistor TR, and a gate connected to the storage node SN.

The readout transistor TR has a drain connected to the source of the amplifier transistor TA, a source connected to the detection line 35, and a gate connected to a line 34 supplying a read control signal (READ) (which line will hereinafter be referred to as a read control line).

The amplifier transistor TA has a function of amplifying an amount of charge (received light potential) accumulated at the storage node SN when positive charge generated in the photodiode PD is accumulated at the storage node SN that is in the floating state again after being reset. The readout transistor TR controls timing of discharging the received light potential amplified by the amplifier transistor TA to the detection line 35. After the passage of a certain accumulation time, the read control signal (READ) is activated to turn on the readout transistor TR. Thus, a voltage is applied to the source and the drain of the amplifier transistor TA, and the amplifier transistor TA passes a current corresponding to a gate potential at that time. Thereby a potential change corresponding to the received light potential and increased in amplitude appears in the detection line 35. This potential change is output as the detection potential Vdet from the detection line 35 to the outside of the light sensor section 1. Alternatively, the detection current Idet whose value changes according to the received light potential is output from the detection line 35 to the outside of the light sensor section 1.

FIG. 5A is a top view of the TFT array substrate 201 before the TFT array substrate 201 and the CF substrate 202 are laminated to each other as in FIG. 2 and a liquid crystal is sealed in.

Elements and nodes shown in FIG. 5B in the pattern diagram of FIG. 5A are identified by the same reference numerals, so that electric connections between elements are clear.

The VDD line 31, the VSS line 32, and the detection line 35 are formed by a wiring layer of aluminum (AL), for example. The reset line 33 and the read control line 34 are formed by a gate metal (GM), for example molybdenum Mo. The gate metal (GM) is formed in a layer lower than the wiring layer of aluminum (AL). Four polysilicon (PS) layers are disposed in a state of being isolated from each other as a layer higher than the layer of the gate metal (GM) and lower than the layer of aluminum (AL). The reset transistor TS, the readout transistor TR, the amplifier transistor TA, and the photodiode PD each have the PS layer.

The transistors have a transistor structure in which an N-type impurity is introduced into one part and another part of the PS layer intersecting the gate metal (GM) to form a source and a drain.

On the other hand, in the photodiode PD, a P-type impurity and an N-type impurity, that is, impurities of opposite conductivity types are introduced into one part and another part of a thin film semiconductor layer 36 formed by the PS layer, and thus the photodiode PD has a diode structure. The P-type impurity region forms the anode (A) region of the photodiode PD or the storage node SN. The N-type impurity region forms the cathode (K) region of the photodiode PD, and is connected to the VDD line 31 in the higher layer via a contact.

Incidentally, in the plan view of FIG. 5A, the backlight side of a light receiving region (an I-region or a D-region) possessed by the three transistors (TR, TS, and TA) is shielded from light by an electrode possessed by each transistor. However, the front side also needs to be shielded from extraneous light. Thus, in the plane pattern of the black matrix 21K shown in FIG. 4, for example, a part of the sensor opening SA is in practice shielded from light by the same light shielding material as that of the black matrix 21K or the like, though not specifically shown in the figures.

For a similar reason, the front side of a switching element SW of a pixel (PIX) is also shielded from light.

FIG. 6 is a top view of the TFT array substrate 201 in a pixel (PIX) of a liquid crystal of an FFS (Field Fringe Switching) system. A liquid crystal of the FFS system is referred to also as a liquid crystal of an "In Plane Switching (IPS)-Pro" system.

FIG. 6 shows a pixel electrode 40 formed with the TFT array substrate 201 as a base, various wiring, a switching element SW, and connections of the pixel electrode 40, the various wiring, and the switching element SW.

The pixel electrode 40 is formed by a transparent electrode layer (TE), and has a plurality of slits. Though not specifically shown in the figures, a common electrode is formed below the pixel electrode 40 in such a manner as to face the pixel electrode 40. The common electrode is formed by a transparent electrode layer (TE) common to all the pixels.

The pixel electrode 40 is connected to internal wiring 42 formed by aluminum (AL) or the like in a lower layer via a contact 41. The internal wiring 42 is connected to one of a source and a drain formed in a thin film semiconductor layer 43 of the switching element SW formed by polysilicon (PS). The other of the source and the drain of the thin film semiconductor layer 43 is connected with a signal line 45 formed by aluminum (AL). A vertical scanning line 44 intersecting in a lower layer than the thin film semiconductor layer 43 is formed by a gate metal (GM) such as molybdenum (Mo) or the like, and is disposed in a direction orthogonal to the signal line 45.

Incidentally, the CF substrate 202 is laid above the TFT array substrate 201 (a part not shown in FIG. 6) having the various patterns shown in FIG. 6, and the liquid crystal layer 203 is formed between the two substrates (see FIG. 1). In addition, the first polarizer 206 and the second polarizer 207 are disposed on the two substrates.

The liquid crystal layer 203 in this case is formed by a nematic liquid crystal. The first polarizer 206 and the second polarizer 207 provided in a state of adhering closely to the external surfaces of the TFT array substrate 201 and the CF substrate 202 via an adhesive are disposed in a state of crossed Nicols.

Materials usable for the signal line 45 and the vertical scanning line 44 (gate metal (GM)) include aluminum (AL), molybdenum (Mo), chromium (Cr), tungsten (W), titanium (Ti), lead (PB), composite layers thereof (for example Ti/Al), or alloy layers thereof.

<Structure and Light Receiving Characteristics of Photodiode PD>

Figure 7A:
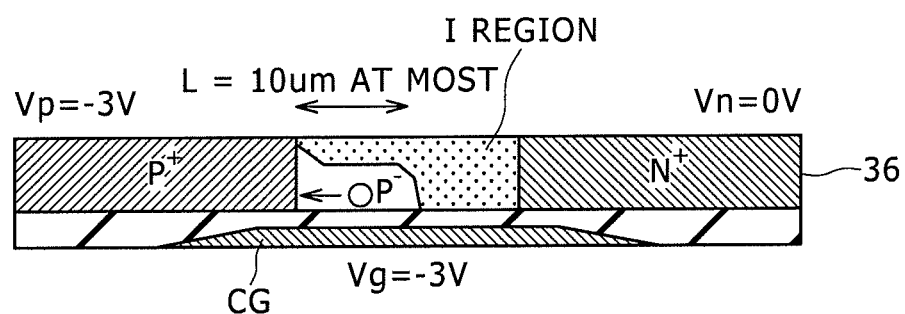
FIGS. 7A and 7B are diagrams schematically showing photodiodes of a PIN structure (A) and a PDN structure (B) according to the embodiment of the present invention.
Figure 7B:
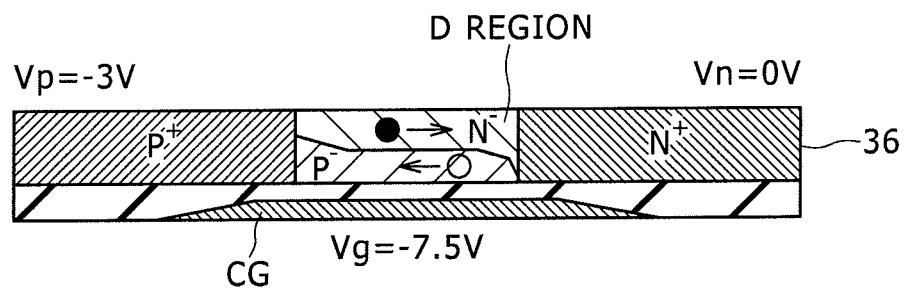

FIG. 7A shows a photodiode PD of the PIN structure, and FIG. 7B shows a photodiode PD of the PDN structure.

A region having light receiving sensitivity in the thin film semiconductor layer 36 of the photodiode PD is an I-region into which no impurity is introduced in the PIN structure (FIG. 7A), and is a D-region ($N^-$ region) into which an N-type impurity is introduced at a low concentration in the PDN structure (FIG. 7B).

When a reverse bias is applied to the thin film semiconductor layer 36 as shown in the figures, for example, a depletion layer expands within the I-region or the D-region. Back gate control (electric field control by the control gate CG) is performed to promote the depletion. However, a depletion of about 10 [μm] at most from a $P^+$ region occurs in the PIN structure. The PDN structure depletes substantially the whole of the D-region, and thus offers an advantage of having a correspondingly wider area with light receiving sensitivity.

Either of the PIN structure and the PDN structure can be adopted in the present embodiment.

The photodiode PD as a position sensor of such a structure is designed to have sensitivity to non-visible light, for example infrared light. It is desirable that the photodiode PD have a high sensitivity to infrared light. However, when the photodiode PD has a high sensitivity to visible light and near-ultraviolet light, the photodiode PD is desirably used in combination with an IR filter that selectively transmits infrared light.

Non-visible light includes for example infrared light or ultraviolet light. Incidentally, according to the International Commission on Illumination (CIE: Commission Internationale de l' Eclairage), a wavelength boundary between ultraviolet light (this is also an example of non-visible light) and visible light is 360 [nm] to 400 [nm], and a wavelength boundary between visible light and infrared light is 760 [nm] to 830 [nm]. In practice, however, wavelengths equal to or less than 350 [nm] may be regarded as ultraviolet light, and wavelengths equal to or more than 700 [nm] may be regarded as infrared light. In this case, suppose that a wavelength range of non-visible light is 350 [nm] to 700 [nm]. However, in the present embodiment, the wavelength boundaries of non-visible light may be defined arbitrarily within the above ranges of 360 [nm] to 400 [nm] and 760 [nm] to 830 [nm].

When infrared light (IR light) is used as non-visible light, the thin film semiconductor layer 36 (FIGS. 7A and 7B) of the photodiode PD having a peak of sensitivity to IR light is desirably formed of polycrystalline silicon or crystalline silicon having an energy band gap of 1.1 [eV] between a valence band and a conduction band, the energy band gap of 1.1 [eV] being a smaller value than the energy band gap of a light receiving element receiving visible light (for example 1.6 [eV]). An optimum value for the energy band gap Eg is calculated by $Eg=h\nu$ (h is Planck's constant, and $\nu=1/\lambda$ ($\lambda$ is the wavelength of light)).

On the other hand, when the thin film semiconductor layer 36 (FIGS. 7A and 7B) is formed of amorphous silicon or microcrystalline silicon, the energy band gap levels of these semiconductor materials have a distribution, and thus the semiconductor materials have a capability (sensitivity) of receiving infrared light and ultraviolet light. Hence, photodiodes PD formed of these semiconductor materials have a capability of receiving not only visible light but also non-visible light of infrared rays and ultraviolet rays, and are thus usable as a light receiving element for visible light and non-visible light.

From the above description, the thin film semiconductor layer 36 of the photodiode PD suitably applicable to the present embodiment is formed of polycrystalline silicon, crystalline silicon, amorphous silicon, or microcrystalline silicon. In any case, a semiconductor material for the photodiode PD in the present embodiment is desirably selected and designed to have a higher absorption coefficient than a photodiode designed to receive visible light. When such a design is difficult, the photodiode PD may be used in combination with an IR selecting filter.

<Light Storage and Light Storing Material>

Figure 8:
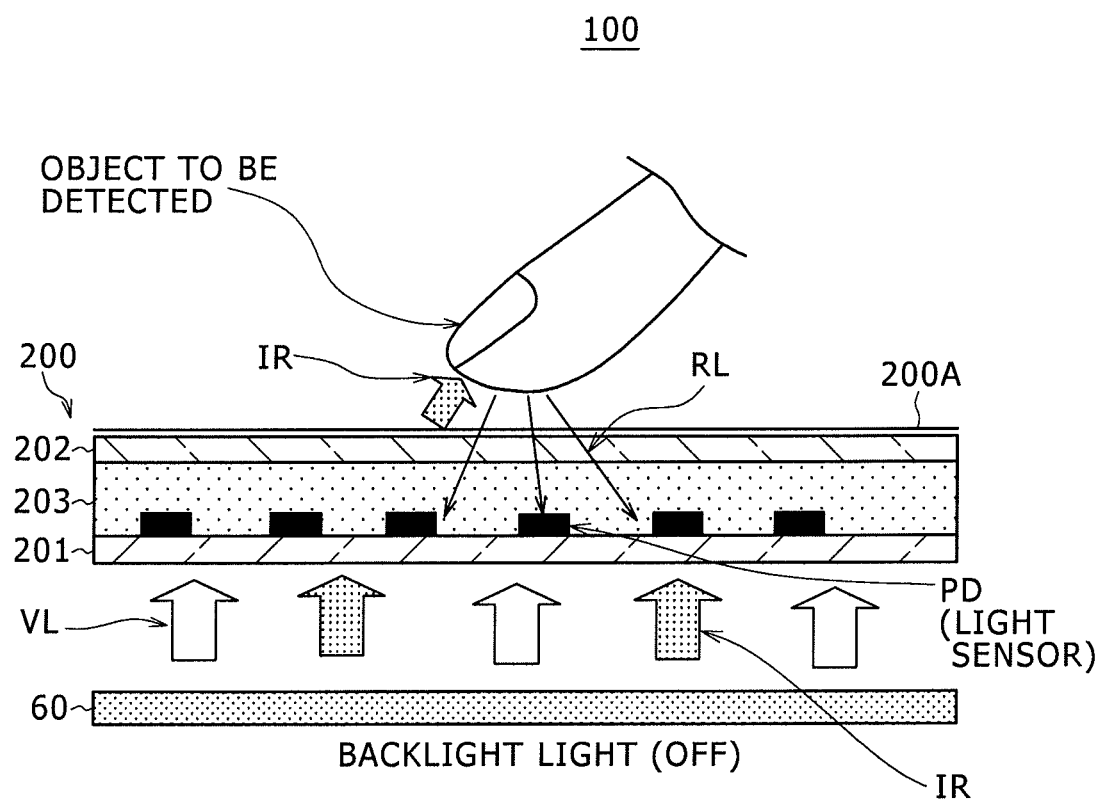
FIG. 8 is a schematic sectional view of the display device according to the first embodiment of the present invention, the sectional view being of assistance in explaining IR light producing means.

FIG. 8 is a schematic sectional view of the liquid crystal display device 100, the sectional view being of assistance in explaining IR light producing means used for position detection.

As shown in FIG. 8 and FIG. 1, a photoluminescent member (light storing section 60) is formed between the backlight 300 and the liquid crystal panel, for example.

While the backlight 300 is being lit, the light storing section 60 absorbs ultraviolet to visible light (wavelengths of 250 [nm] to 780 [nm], for example) of the backlight light applied from the backlight 300, and emits output light including non-visible light and visible light. After the backlight 300 is turned off, the light storing section 60 produces an afterglow including visible light and IR light (more than 780 [nm]). This action is referred to as "light storage."

FIG. 8 illustrates a time of output of an afterglow. The afterglow includes a non-visible light component, or an infrared light component (IR), and a visible light component (VL).

Depending on a light storing material forming the light storing section 60, the duration of the afterglow ranges from a duration on the order of microseconds to a long duration of a few ten hours (about one day). A component of the long duration of the "afterglow" is referred to as "phosphorescence," which differs from "fluorescence," whose duration is on the order of nanoseconds. Incidentally, it suffices for the "afterglow" to include "phosphorescence," and the afterglow may further include "fluorescence."

The light storing effect of the light storing section 60 makes it possible to reduce the number of IR light sources 301b shown in FIG. 1, or totally eliminate a need for the IR light sources 301b in some cases. As a result, a cost reduction can be achieved.

In addition, because the afterglow includes a visible light component (VL), even when the backlight 300 is turned off in a dark, the visible light component (VL) is output from the light storing material, enabling supply of modulated light used to display images and characters. Further, the visible light component (VL) can be used as illuminating light illuminating a hand at a time of detecting an object to be detected.

The infrared light component (IR) output from the light storing section 60 is light having wavelengths more than 780 [nm] to which the eye of a human does not have sensitivity. The photodiode PD including silicon as a main component of the thin film semiconductor layer 36 has high sensitivity to the infrared light component (IR) in a wavelength region of 780 [nm] to 1100 [nm] (matching is attained). Hence, it is desirable to select a material and the like for the light storing section 60 such that the afterglow includes light having wavelengths more than 780 [nm], more preferably wavelengths of 780 [nm] to 1100 [nm].

Infrared photoluminescent materials such as organic fluorescent (phosphorescent) materials, inorganic phosphors, inorganic light storing materials and the like can be used as materials that absorb ultraviolet to visible light (wavelengths of 250 [nm] to 780 [nm]) of the backlight or ambient light (extraneous light) and emit light including IR light (wavelengths of more than 750 [nm]).

The light storing section 60 can be formed as an independent constitution or so as to be effectively included in another constitution as follows.

(1) The light storing section 60 is formed by making a light storing material into the form of a plate or laminating a plurality of sheets into layers.

(2) An infrared photoluminescent material as described above is dispersed in a fluorescent tube backlight.

(3) The IR light source 301b itself is formed by a white LED, and an infrared photoluminescent material is put inside the package sealed by glass or the like as a phosphor.

(4) An infrared photoluminescent material is dispersed within the material of the light guide plate 302.

(5) An infrared photoluminescent material is patterned as a diffusion material on the light guide plate 302, or a diffusing sheet is coated with an infrared photoluminescent material and then the sheet is laminated to the light guide plate 302. The patterning or sheet lamination can be performed at the position of the light emitting surface of the light guide plate 302 or a position closer to the light guide plate 302 than a reflecting surface as a surface opposed to the emitting surface.

(6) An infrared photoluminescent material is dispersed as particles on the submicron order into a planarizing film of a thin film transistor for driving.

Light storing materials such as organic fluorescent materials, organic phosphorescent materials, inorganic fluorescent materials, inorganic phosphorescent materials, and the like can be used as photoluminescent material. Among these infrared photoluminescent materials, inorganic light storing materials are excellent in terms of heat resistance and light-fastness, and enable position detection in a dark environment for a long period of time without light source driving.

A zinc sulfide type (ZnS:Cu) or an oxide material formed by adding a rare-earth element or the like to an aluminum oxide can be used as inorganic light storing material. An oxide material formed by adding a rare-earth element or the like to an aluminum oxide is desirable because of a long duration of the afterglow. Specifically, LumiNova (proprietary name) formed by bonding a rare-earth metal to strontium aluminate emits high-luminance light for a long period of time, and is thus particularly desirable as an inorganic light storing material for the light storing section 60.

<Operation>

An example of operation of the liquid crystal display device 100 will next be described with reference to FIGS. 1 to 7B and FIG. 8.

Illuminating light from the backlight 300 placed on the rear side of the liquid crystal panel 200 is made incident on the inside of the liquid crystal panel 200 from the light storing section 60, passes through the first polarizer 206, the TFT array substrate 201, the liquid crystal layer 203, the color filter 204, the CF substrate 202, and the second polarizer 207 in this order, and is then emitted from the front side to the outside.

The illuminating light during the passage undergoes polarization and modulation to be changed in plane of polarization, light intensity and the like. In addition, according to a realized form of the light storing section, the light storing section absorbs a part of the illuminating light, and is able to produce an afterglow after the illumination is turned off.

In the case of FIG. 1 and FIG. 8, the illuminating light from the backlight 300 is made incident on the TFT array substrate 201 through the light storing section 60 and the first polarizer 206, and efficiently passes through an opening provided within a light sensor section 1.

As shown in FIG. 8, the photodiode PD is formed on the TFT array substrate 201. The backlight side of the photodiode PD is covered by an electrode, thus making it difficult to effect incidence of the illuminating light. Thus, the light is output from the TFT array substrate 201 through for example the opening within the light sensor section 1 shown in FIG. 5A and the opening between pieces of wiring within the pixel (PIX) shown in FIG. 6.

The light output from the TFT array substrate 201 passes through the liquid crystal layer 203, the color filter 204, the CF substrate 202, and the second polarizer 207 (FIG. 1), and is then output from the display surface 200A to the outside for screen display.

In the process of the passage, the transmitted light is polarized in a first direction at the time of passing through the first polarizer 206. While the light passes through the inside of the liquid crystal layer 203, the direction of polarization of the transmitted light is changed by a predetermined angle along a direction of molecular alignment of the liquid crystal due to an effect of optical anisotropy of the liquid crystal molecules. At the time of passing through the second polarizer 207, the transmitted light is polarized in a second direction shifted from the first direction by a predetermined angle.

The direction of the polarized light being passed through the liquid crystal layer 203 during the effect of the three-time polarization is changed independently for each pixel by controlling the intensity of an electric field applied to the liquid crystal layer 203 according to the potential of an input video signal. Thus, the light passing through each pixel undergoes modulation to be changed to brightness corresponding to the potential of the video signal, and then emitted from the liquid crystal panel 200 to be used for predetermined image display.

As already described, the liquid crystal panel 200 has an effective display region PA for displaying an image, and has a plurality of pixels arranged in the pixel regions (PA1) of the effective display region PA. A light sensor section 1 is disposed in the sensor regions (PA2) of the effective display region PA, the light sensor section 1 including a light receiving element that detects an object to be detected such as the finger of a human, a stylus pen or the like to realize a function of a so-called touch panel.

The light passed through the light sensor section 1 is emitted from the display surface 200A of the liquid crystal panel 200 as it is without being modulated by an electric signal as with the light passing through a pixel.

There is a case where for example a display content according to an application prompts for a user designation during image display. In such a case, as shown in FIG. 8, a user lightly touches the display screen with a finger (or a stylus pen or the like).

When an object to be detected such as a finger, a stylus pen or the like is brought into contact with or into proximity to the display screen, the light emitted from the liquid crystal panel 200 is reflected by the object to be detected, and then returned to the inside of the liquid crystal panel 200. This returned light (reflected light (RL)) is repeatedly refracted and reflected by layer interfaces and reflectors such as wiring and the like within the liquid crystal panel 200. Therefore, the reflected light generally travels so as to be spread in the liquid crystal panel 200. Thus, though depending on the size of the object to be detected, the reflected light reaches at least one of the plurality of photodiodes PD.

When a part of the reflected light reaching the photodiode PD is made incident on the photodiode PD, to which a predetermined reverse bias is applied, the photodiode PD performs photoelectric conversion and then outputs a charge from the anode (A) electrode, for example. The amount of the charge at this time represents received light data proportional to an amount of received IR light. The received light data (charge amount) is output as a detection potential Vdet or a detection current Idet from the detection line 35 of the readout circuit shown in FIG. 5B already described above.

The detection potential Vdet or the detection current Idet is sent to the sensor driver 13 side by the switch array 14 shown in FIG. 3. The detection potential Vdet or the detection current Idet is collected as received light data in the sensor driver 13. Further, the detection potential Vdet or the detection current Idet is input to a position detecting section 402 within a data processing section 400 shown in FIG. 1. A set of addresses of a row and a column for each detection potential Vdet or detection current Idet is sequentially input in real time from the liquid crystal panel 200 side to the position detecting section 402 or a controlling section 401. Thus, intra-panel positional information (the detection potential Vdet or the detection current Idet) for the object to be detected is associated with the row and column direction address information, and is then stored in a memory not shown in the figures within the data processing section 400.

By superimposing the positional information of the object to be detected and display information on each other on the basis of the information within the memory, the liquid crystal display device 100 can determine that "a user has made a designation on the basis of the display information, using a finger, a stylus pen or the like" or that "a user has input predetermined information by moving a stylus pen or the like on the display screen." That is, the liquid crystal display device 100 can realize a function similar to a function obtained when a touch panel is added to the liquid crystal panel 200 by a thin display panel that does not have a touch panel added thereto. Such a display panel will be referred to as an in-cell touch panel.

According to the present embodiment, even when the backlight light is off as shown in FIG. 8, an infrared light component (IR) included in an afterglow is reflected by the object to be detected (finger or the like), and then made incident on photodiodes PD. Therefore the position and the size of the object to be detected can be detected.

The afterglow also includes a visible light component (VL). Therefore, even when a backlight power supply is turned off, a light modulating section having the liquid crystal layer 203 as a center thereof is dimly illuminated, so that a displayed image or the like is visible. The user can thus continue designation input for operating an application or the like or information input by a finger, a stylus pen or the like.

The backlight might be used in a dark environment with the brightness of the backlight extremely lowered even though the backlight power supply is not turned off. At this time, when the environment suddenly becomes brighter, it can be difficult to see an image until the eyes are adjusted to the brightness of the environment due to a lack of brightness of the backlight. Even in such a case, the visible light component (VL) output from the light storing section 60 becomes an auxiliary illuminating light to alleviate the difficulty in seeing the image.

Second Embodiment

The present embodiment relates to a reflective type liquid crystal display device.

A typical reflective type liquid crystal panel does not have the backlight 300 in FIG. 1, but instead has an illuminating section (front light) disposed between a liquid crystal layer 203 and a display surface 200A.

Figure 9:
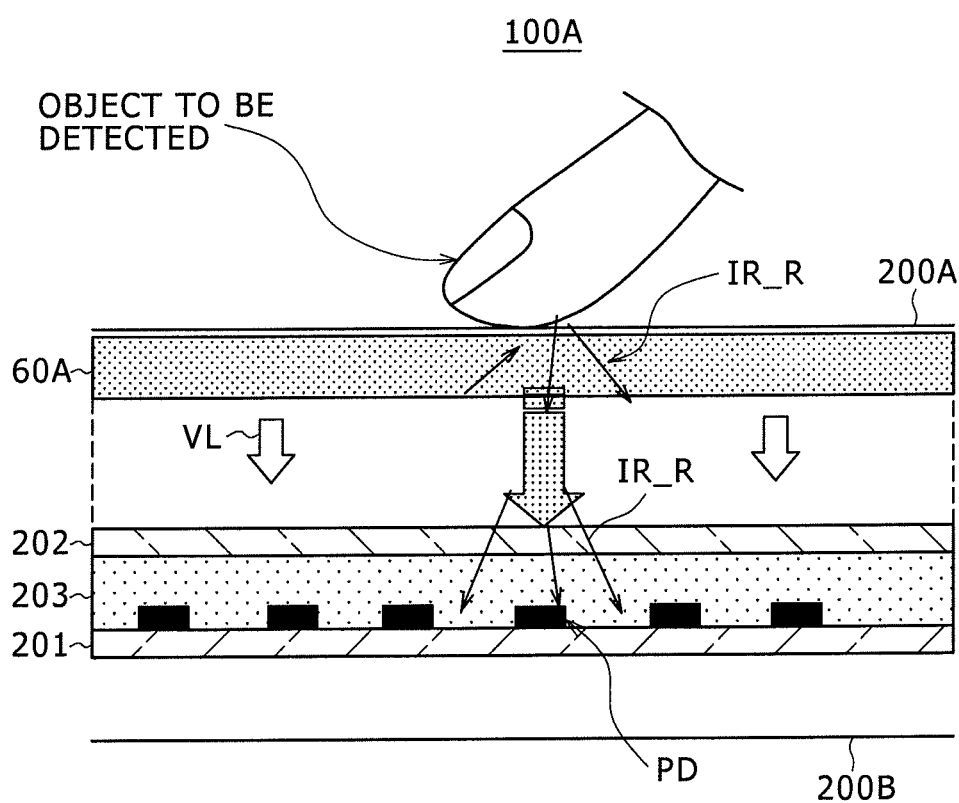
FIG. 9 is a schematic sectional view of a display device according to a second embodiment, the sectional view being of assistance in explaining IR light producing means.

FIG. 9 is a schematic sectional view of a liquid crystal display device according to the present embodiment, the sectional view being of assistance in explaining IR light producing means used for position detection.

The liquid crystal display device 100A illustrated in FIG. 9 includes a photoluminescent member (light storing section 60A) having a front light function on the display surface 200A side of a reflective type liquid crystal panel. In addition, a reflecting surface 200B is provided on a side opposite from the display surface 200A.

The light storing section 60A is formed by using a light storing material emitting both of visible light and infrared light as illustrated in the first embodiment.

As shown in FIG. 9, illuminating light emitted from the light storing section 60A includes a visible light component (VL) and an infrared light component (IR). The illuminating light passes through a CF substrate 202, a liquid crystal layer 203, and a TFT array substrate 201, is reflected by the reflecting surface 200B, follows the same path again, passes through the inside of the light storing section 60A, and is then emitted from the display surface 200A to the outside.

The visible light component (VL) of the illuminating light undergoes modulation according to an input signal in the middle of such a path, so that information is added to the visible light component (VL) to be used for display.

On the other hand, the infrared light component (IR) of the illuminating light passes through a similar path and goes out from the display surface 200A, whereas when an object to be detected such as a finger or the like is in contact with or in proximity to the display surface 200A, there is a reflected infrared light component (IR_R) reflected and returned by the object to be detected. The reflected infrared light component (IR_R) is made incident from the CF substrate 202, passed through the liquid crystal layer 203, and then received by photodiodes PD. Thereby the position and the size of the object to be detected can be detected as in the first embodiment.

As in the first embodiment, the constitution of the second embodiment enables position detection after illumination is turned off. That is, in the present embodiment, even when light emission control on the light storing section 60A serving also as an illuminating section is stopped, the position and the size of the object to be detected can be detected by an infrared light component (IR) of an afterglow even after the light emission stop control. In addition, as with the first embodiment, the second embodiment offers an advantage of ease of continuation of operation after illumination is turned off and an advantage of alleviating difficulty in seeing a displayed image which difficulty occurs momentarily at a time of a change in brightness of the environment.

In the first embodiment shown in FIG. 8, there is a relatively great loss in the infrared light component (IR) due to absorption and reflection by members between the light storing section 60 and the display surface 200A.

On the other hand, in the second embodiment, as shown in FIG. 9, the light storing section 60A is disposed close to the display surface 200A, thus resulting in a high efficiency of use of the infrared light component (IR) and a high S/N ratio of position detection.

Incidentally, the light storing section 60A in the second embodiment may serve also as a protective plate of the surface of the image display device. An infrared photoluminescent material may be used in a state of being dispersed as particles on the submicron order in an overcoat material forming the display surface of the protective plate.

When the light quantity of front light is insufficient, an illuminating section (front light) may be provided separately from the light storing section 60A, and light from the light storing section 60A may be used as auxiliary illuminating light for the illuminating section.

Third Embodiment

Figure 10:
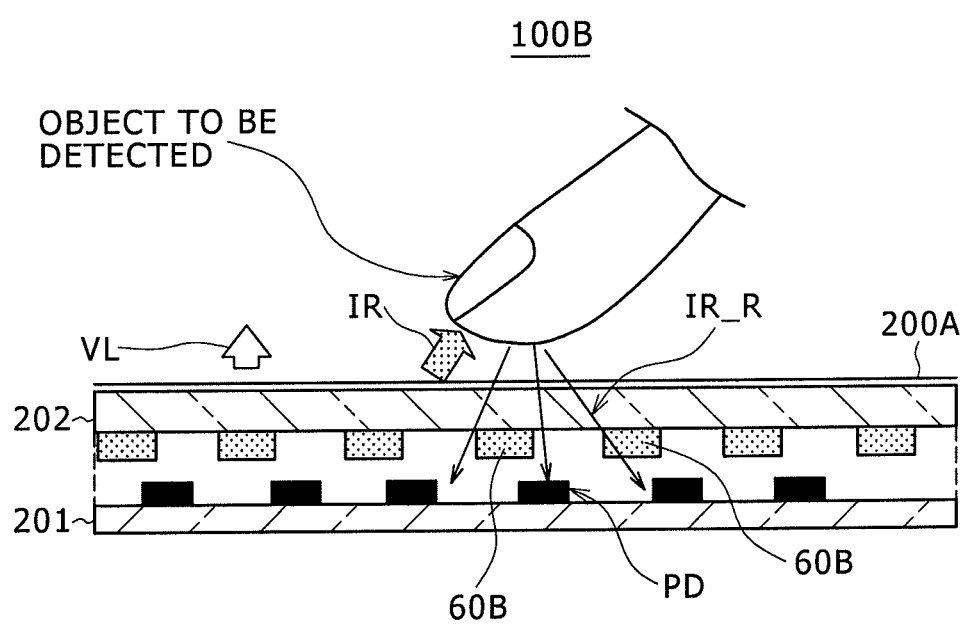
FIG. 10 is a schematic sectional view of a display device according to a third embodiment, the sectional view being of assistance in explaining IR light producing means.

FIG. 10 is a schematic sectional view of a liquid crystal display device according to the present embodiment, the sectional view being of assistance in explaining IR light producing means used for position detection.

In the liquid crystal display device 100B illustrated in FIG. 10, a plurality of light storing sections 60B separated from each other are patterned on a color filter side of a CF substrate 202 of a liquid crystal panel. The surface of the CF substrate 202 on which surface the light storing sections 60B are formed may be a surface on the side of a liquid crystal layer 203 as shown in FIG. 10, or may be a surface on the side of a display surface 200A.

In the present embodiment, the light storing sections 60B can be disposed at only necessary positions. It is thereby possible not only to obtain similar advantages to those of the first embodiment but also improve accuracy of position detection.

In addition, for example, a combination with a color filter enables a design for improving accuracy of detection of IR light.

A fourth embodiment and a fifth embodiment to be described next are more concrete embodiments of the third embodiment.

Incidentally, while an illuminating section is necessary in the third to fifth embodiments, a light storing section functions as a simple auxiliary light when illumination is turned off.

Fourth Embodiment

Figure 11:
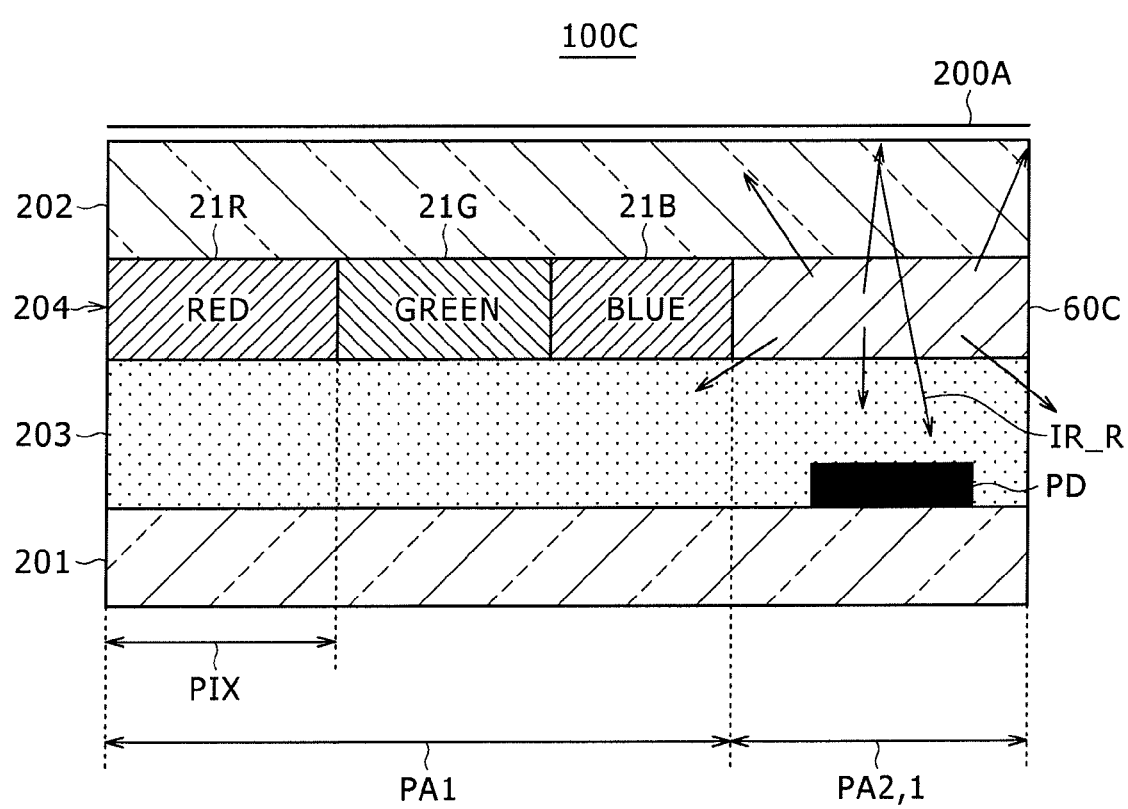
FIG. 11 is a schematic sectional view of a display device according to a fourth embodiment, the sectional view being of assistance in explaining IR light producing means.
Figure 12:
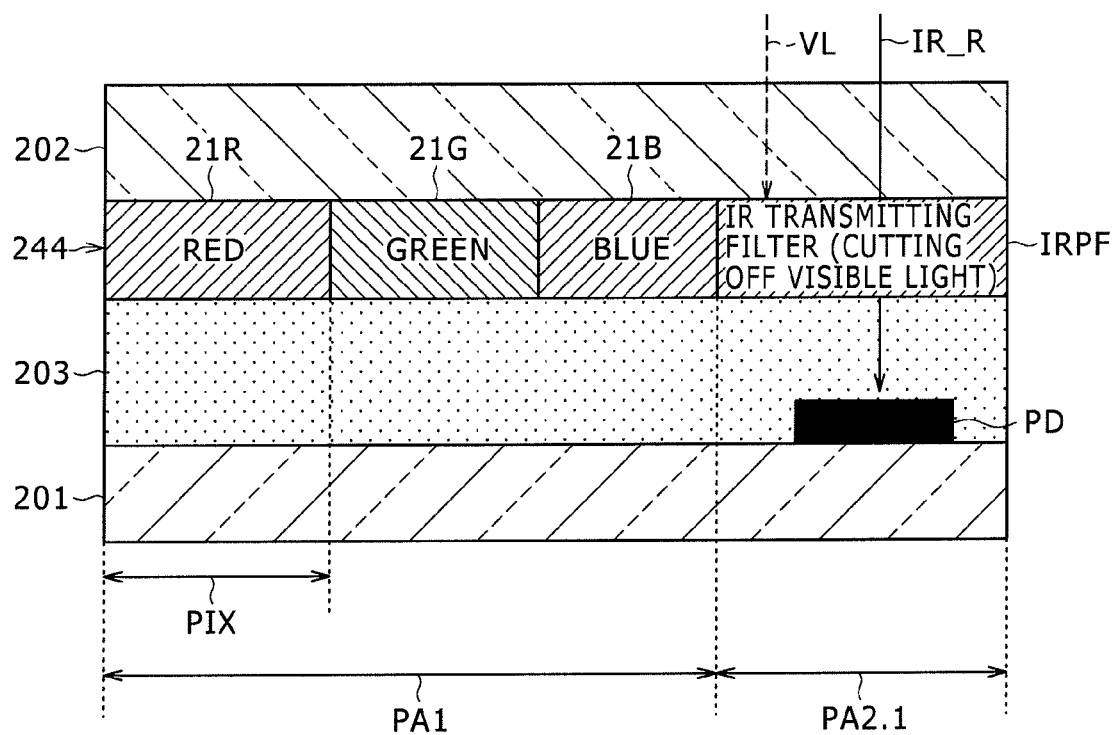
FIG. 12 is a sectional view of a comparative example in a liquid crystal display device to which the present invention is not applied, the sectional view showing substantially the same section as FIG. 11.

FIG. 11 is a schematic sectional view of a liquid crystal display device according to a fourth embodiment, the sectional view being of assistance in explaining IR light producing means used for position detection. FIG. 12 is a sectional view of a comparative example in a liquid crystal display device to which the present invention is not applied, the sectional view showing substantially the same section as FIG. 11.

The comparative example shown in FIG. 12 has an IR transmitting filter (IRPF) that blocks a visible light component (VL) and which transmits infrared rays including a reflected infrared light component (IR_R). The IR transmitting filter (IRPF) is formed in a sensor region (PA2) or a light sensor section 1. When a black matrix 21K has a plane pattern as shown in FIG. 4, for example, the IR transmitting filter (IRPF) is disposed within the sensor opening SA of the black matrix 21K in the light sensor section 1. As shown in FIG. 12 and FIG. 4, a red filter 21R, a green filter 21G, and a blue filter 21B are disposed around the IR transmitting filter (IRPF). These four kinds of filters and the black matrix 21K form a color filter 204.

The liquid crystal display device 100C according to the present embodiment shown in FIG. 11 has a photoluminescent member (light storing section 60C) capable of outputting an afterglow including infrared rays in place of the IR transmitting filter (IRPF) shown in FIG. 12.

Because an S/N ratio is degraded when a visible light component (VL) is transmitted to the photodiode PD side, the light storing section 60C in the present embodiment needs to have a filter function of blocking the visible light component (VL), which filter function is similar to that of the IR transmitting filter (IRPF) in FIG. 12. Specifically, it is desirable to form the light storing section 60C as a double-layer structure, and provide the layer on the photodiode PD side with a visible light blocking function similar to that of the IR transmitting filter (IRPF) and provide the other layer with a light storing function.

However, the light storing function does not necessarily need to be realized by providing the light storing layer. A photoluminescent material may be dispersed in the layer that blocks visible light and transmits infrared rays, or a surface of the layer which surface is opposite from the display surface 200A side may be coated with a photoluminescent material.

According to the fourth embodiment, it is possible to obtain similar advantages to those of the first embodiment, and realize the light storing function by making a little change to the existing color filter 204 at a necessary position near the photodiode PD.

In addition, many of infrared photoluminescent materials (infrared light storing materials) are colored because the infrared photoluminescent materials absorb visible light. However, a decrease in transmittance of the panel can be avoided because an infrared photoluminescent material is selectively disposed in the region blocking visible light.

Fifth Embodiment

Figure 13:
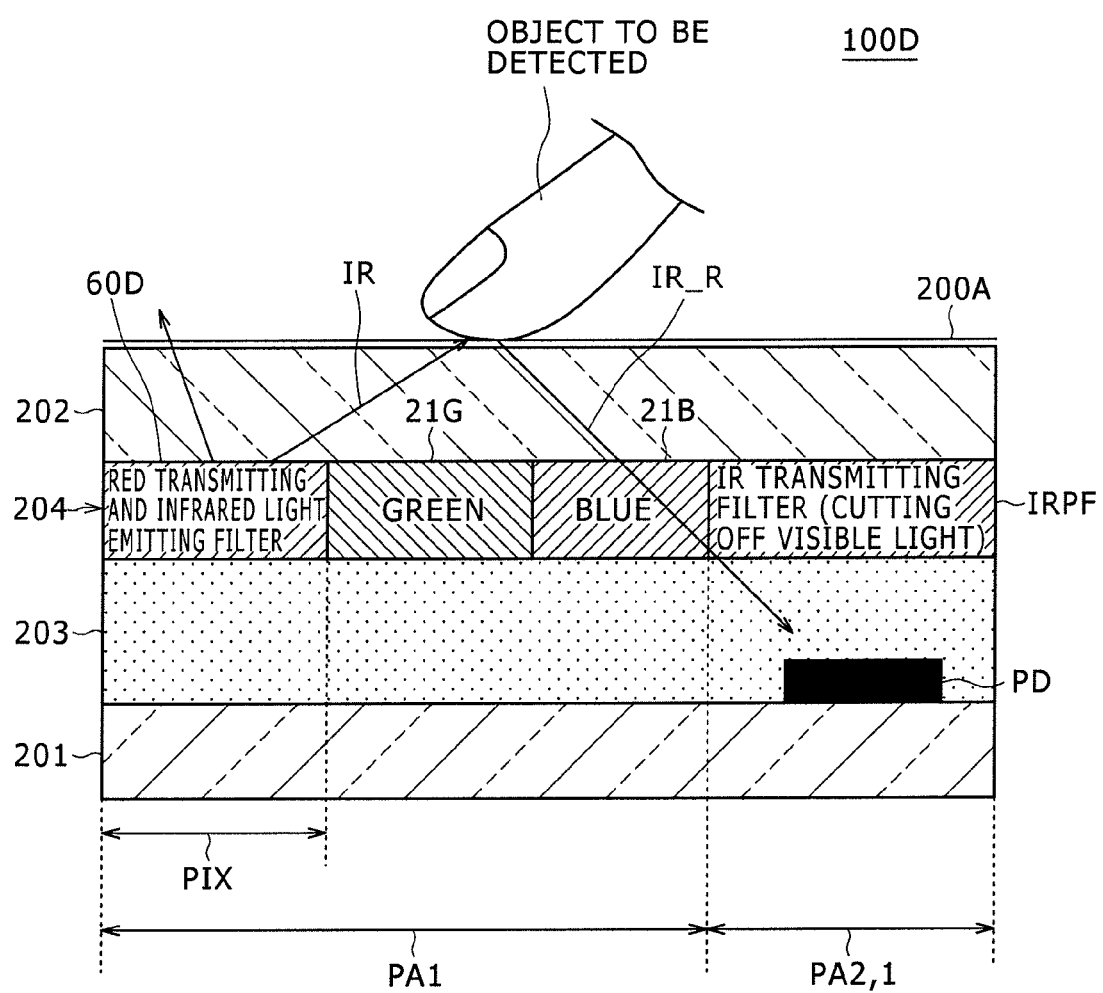
FIG. 13 is a schematic sectional view of a display device according to a fifth embodiment, the sectional view being of assistance in explaining IR light producing means.

FIG. 13 is a schematic sectional view of a liquid crystal display device according to a fifth embodiment, the sectional view being of assistance in explaining IR light producing means used for position detection.

The liquid crystal display device 100D shown by the diagram has a filter light storing section 60D combining the function of the red filter 21R and the light storing function in place of the red filter 21R at the position of the red filter 21R in the structure of FIG. 12. Specifically, the light storing function can be provided by dispersing an infrared photoluminescent material in a conventional red filter 21R.

Incidentally, when this constitution is adopted, the photoluminescent material desirably does not emit light in a red region. That is, the photoluminescent material desirably does not absorb a visible light component (VL) in the red region but transmits the visible light component (VL) in the red region so that the function of a pixel for red display is not impaired. Thus, the filter light storing section 60D is desirably formed of a photoluminescent material absorbing a blue region and a green region of visible light. Thereby a decrease in transmittance of the liquid crystal panel can be avoided.

A reason why the red filter (red filter 21R in FIG. 12) is provided with the light storing function to form the filter light storing section 60D is that a red filter material has a high transmittance in an infrared region, and thus a transmittance characteristic can be controlled easily, and that luminous efficiency of an reflected infrared light component (IR_R) of an afterglow can be increased, and thus accuracy (S/N ratio) of position detection can be made higher. However, a green filter 21G or a blue filter 21B can be provided with the light storing function when the transmittance characteristic can be controlled.

According to the fifth embodiment, it is possible to obtain similar advantages to those of the first embodiment, and realize the light storing function by making a little change to the existing color filter 204 at a necessary position near the photodiode PD.

Incidentally, an IR transmitting filter (IRPF) is formed in a sensor region (PA2), and thus the functionality of blocking visible light is sufficiently high.

Sixth Embodiment

Figure 14:
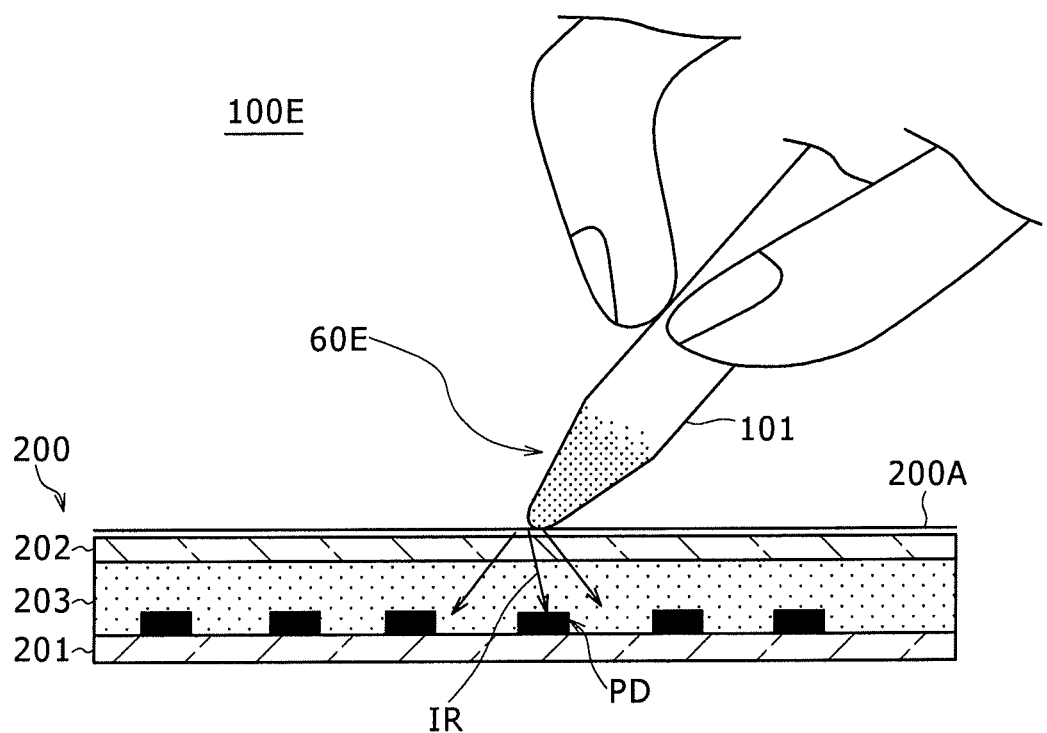
FIG. 14 is a schematic sectional view of a display device according to a sixth embodiment, the sectional view being of assistance in explaining IR light producing means.

FIG. 14 is a schematic sectional view of a liquid crystal display device according to a sixth embodiment, the sectional view being of assistance in explaining IR light producing means used for position detection.

The liquid crystal display device 100D illustrated in FIG. 14 has a stylus pen 101 as an accessory, the stylus pen 101 being an object to be detected.

A light storing section 60E provided in a region including a tip in the stylus pen 101 is formed of a light storing material (photoluminescent material) similar to that of the light storing section 60 in the first embodiment. The stylus pen 101 is used with the pen tip where the light storing section 60E is formed in contact with or in proximity to the display surface 200A of a liquid crystal panel 200 when a user gives an instruction in response to a display content of an application displayed on the liquid crystal panel 200, or inputs information.

The liquid crystal panel 200 includes photodiodes PD for detecting non-visible light (for example IR light), the photodiodes PD being formed on a TFT array substrate 201.

Because FIG. 14 shows an example of a liquid crystal display device, the liquid crystal display device has a liquid crystal layer 203 and a CF substrate 202, and additionally needs an illuminating section and the like. However, the illuminating section is unnecessary when the display panel is for example an emissive type organic EL panel other than a liquid crystal panel.

The present embodiment provides similar advantages to those of the first embodiment. In addition, even when means for producing non-visible light (IR light in this case) such as an illuminating section or the like is not present within the display panel, non-visible light (IR light) for detection (object detection) of the position, size and the like of the object to be detected is supplied from the light storing section 60E formed at the pen tip through the display surface 200A to the inside of the display panel. Thus, a light source for the object detection is not necessary within the display panel, and a power supply when light for the object detection is produced is not necessary for the stylus pen 101, so that the display device as a whole can be reduced in cost.

When the stylus pen 101 is provided with the light storing section 60E, the detection of the stylus pen 101 uses direct light of non-visible light (detection light) instead of using reflection of non-visible light produced within the display panel or output to the outside through the inside of the display panel. Thus, the non-visible light (detection light) reaching a photodiode PD includes a small quantity of a stray light component, which is caused when the non-visible light is repeatedly reflected within the display panel. In addition, photodiodes PD can be disposed close to the display surface 200A. For the two reasons, accuracy of position detection on the basis of output of the photodiodes PD is very high.

The display device according to the present embodiment is not limited to the above description, and various modifications below can be made.

<First Example of Modification>

The first example of modification includes a photodiode PD as a light receiving element for receiving non-visible light, and detects extraneous light including visible light as a main component and controls the intensity of light output from the backlight 300 shown in FIG. 1 according to a result of the detection. While description in the following will be made of an example of modification of the first embodiment shown in FIGS. 1 to 8, the first example of modification can be applied to other embodiments as long as the first example of modification has an illuminating section such as a backlight or the like.

Though not specifically shown, an extraneous light sensor configured to detect extraneous light is disposed in an effective display region PA or a peripheral region CA in the liquid crystal panel 200 shown in FIG. 1. The arrangement position and the number of extraneous light sensors are arbitrary.

When the extraneous light sensors are disposed within the effective display region PA, the extraneous light sensors can be arranged in the form of a matrix as with light sensors (photodiodes PD) for receiving non-visible light. In this case, each extraneous light sensor is disposed at equal distances from a plurality of light sensors present around the extraneous light sensor. For example, the photodiodes PD and the extraneous light sensors desirably form a checkered pattern in a plan view of the effective display region PA.

The extraneous light sensors may be arranged at equal intervals if not in a checkered pattern. In addition, extraneous light sensors may be arranged around four corners of the effective display region PA, or extraneous light sensors may be arranged in line at positions close to at least one of outer sides of the effective display region PA. Thus, the arrangement and the number of extraneous light sensors are not limited.

An equivalent circuit and a plane pattern similar to those of FIGS. 5A and 5B can be applied to a basic constitution of the extraneous light sensor. However, the photodiode of the extraneous light sensor may include for example a different material for a thin film semiconductor layer from that of the photodiode PD as a light sensor. For example, the thin film semiconductor layer of the extraneous light sensor is desirably formed of amorphous silicon or microcrystalline silicon whose energy band gap is distributed broadly so that the extraneous light sensor has a peak of sensitivity to visible light defined in a wavelength range of 350 [nm] to 700 [nm]. For example, a material whose energy band gap is 1.6 [eV] can be used as the thin film semiconductor layer of the extraneous light sensor.

Incidentally, as already described, amorphous silicon or microcrystalline silicon can be used as a material for the thin film semiconductor layer of the photodiode PD in the non-visible light sensor. Materials formed so as to have different energy band gaps and thus have different infrared absorption characteristics are used for the thin film semiconductor layer of the photodiode PD in this case and the thin film semiconductor layer of the extraneous light sensor. However, polysilicon or crystalline silicon, which has a different energy band gap and has somewhat lower sensitivity, can be used as a material for the thin film semiconductor layer of the visible light sensor and the light sensor. In such a case, wavelength selectivity may be imparted to the filter side.

The data processing section 400 shown in FIG. 1 controls the operation of the backlight 300 emitting illuminating light on the basis of received light data obtained by the extraneous light sensors. The position detecting section 402 under control of the controlling section 401 detects the amplitude of a signal (amount of accumulated charge) proportional to the luminance of extraneous light by the received light data, that is, a voltage value (detection potential Vdet) or a current value (detection current Idet). The controlling section 401 adjusts the light emission intensity of the backlight 300 of the liquid crystal display device on the basis of a result of the detection.

Thus, when the received light data obtained by the extraneous light sensors indicates that received light has high intensity, the backlight 300 is controlled to apply illuminating light of higher intensity. When the received light data obtained by the extraneous light sensors indicates that the received light has low intensity, the backlight 300 is controlled to apply illuminating light of lower intensity.

Generally, in an environment in which extraneous light (especially sunlight) comes into a display device having pixel switches of thin film transistors, the contrast of the display device may be lowered by reflection of the surface layer of a display panel, so that an image may not be recognized well. Therefore, the luminance of light emitted from the display panel itself to the outside of the surface of the display panel needs to be higher than reflection luminance on the surface of the display panel. For this, the light emission intensity of the backlight 300 irradiating the display panel from the rear is controlled to be higher.

In conditions of a dark or the like in which the intensity of extraneous light is very low, light reflected by the surface of the display panel does not cause a degradation in image quality (decrease in contrast), and thus the light emission intensity of the backlight 300 needs to be decreased. The first example of modification can lower the surface luminance of the display device, and thereby reduce power consumption of the backlight 300.

The first example of modification has an advantage of being able to control such a degradation in image quality (decrease in contrast) and reduction in power consumption adaptively according to a change in the amount of extraneous light.

Figure 15:
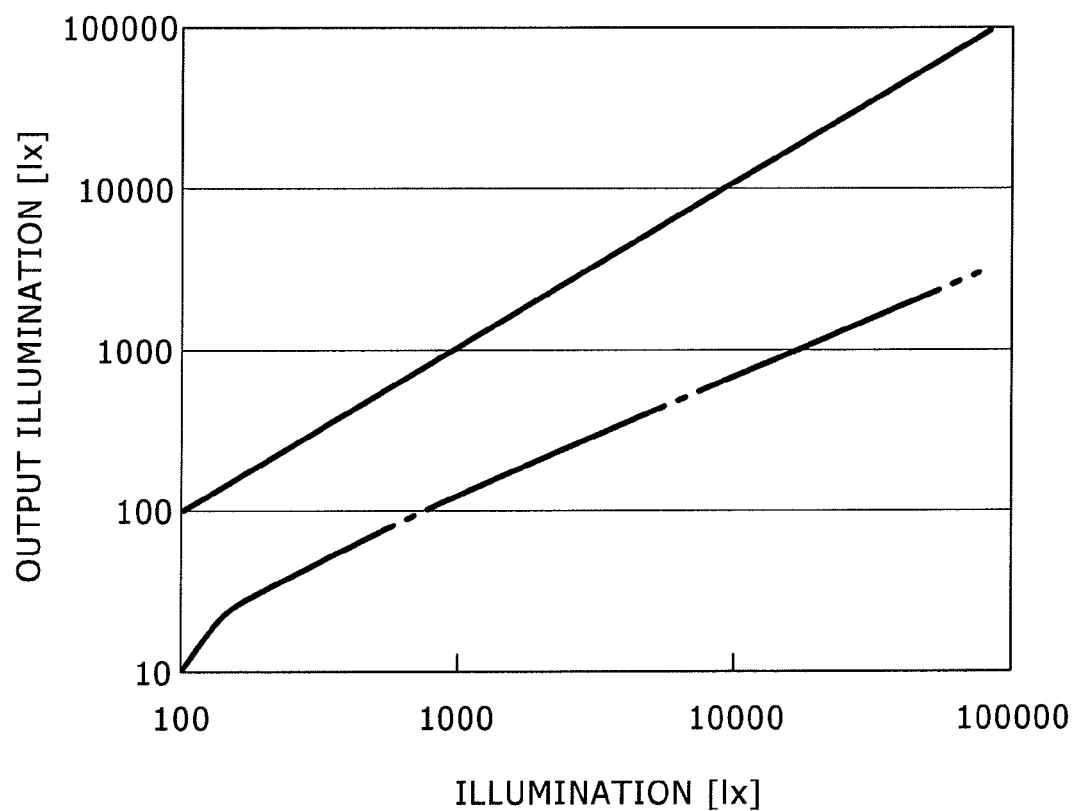
FIG. 15 relates to a first example of modification of an embodiment of the present invention, and is a diagram showing changes of received light data with respect to input light intensity.

FIG. 15 is a diagram showing changes of received light data with respect to input light intensity, which diagram is obtained in a case where an extraneous light sensor is formed in the effective display region PA (application of disposition within the display region) and a case where the extraneous light sensor is formed in the peripheral region CA (non-application of disposition within the display region) in the first example of modification. In FIG. 15, an axis of abscissas indicates the illuminance (unit: a lux) of extraneous light, and an axis of ordinates indicates illuminance (unit: [lx]) into which the value of the received light data obtained from the extraneous light sensor is converted. In FIG. 15, a solid line is a curve in the case where the disposition of the extraneous light sensor within the display region is applied, and a broken line is a curve in the case where the disposition of the extraneous light sensor within the display region is not applied.

As shown in FIG. 15, for example, when extraneous light of 1000 [lx] is made incident, the received light data corresponding to an illuminance of about 100 [lx] is obtained in the case where the extraneous light sensor is formed in the peripheral region CA, whereas the received light data corresponding to an illuminance of about 1000 [lx] is obtained in the case where the extraneous light sensor is formed in the effective display region PA. Thus, light of high intensity can be obtained by providing the extraneous light sensor in the effective display region PA.

Hence, FIG. 15 shows that the extraneous light sensor is preferably disposed within the effective display region PA.

Figure 16A:
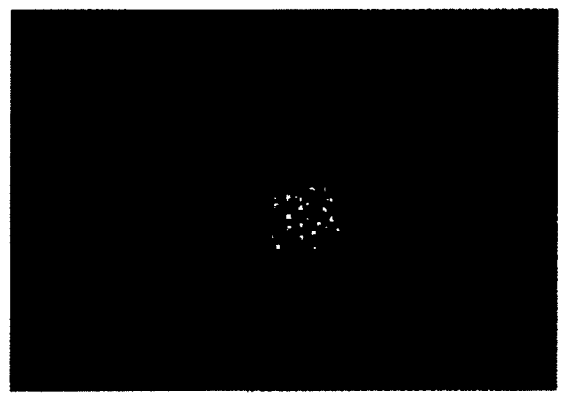
FIGS. 16A and 16B are diagrams showing results of detection when a finger tip is detected in a case where the disposition of an extraneous light sensor within a display region is not applied (A) and a case where the disposition of an extraneous light sensor within a display region is applied (B).
Figure 16B:
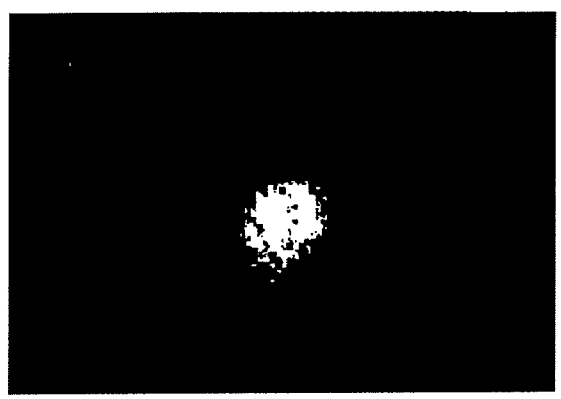

FIG. 16A shows a screen when a finger tip is detected without the first example of modification being applied, and FIG. 16B shows a screen when the finger tip is detected with the first example of modification applied.

The screens shown in FIGS. 16A and 16B are obtained by converting respective outputs of a plurality of light sensor sections finely arranged in the form of a matrix into dot display of detections (white) and non-detections (black) and mapping the dot display on a screen.

FIGS. 16A and 16B also show that detection accuracy is higher when the extraneous light sensor is disposed within the effective display region PA.

According to the first example of modification, in addition to an advantage of being able to control a degradation in image quality (decrease in contrast) and reduction in power consumption adaptively according to a change in the amount of extraneous light, when there is a small amount of ambient extraneous light, in particular, a larger amount of light of the backlight 300 than is necessary is prevented from entering the liquid crystal panel, and thus occurrence of stray visible light can be prevented or suppressed correspondingly. This brings an advantage of being able to improve accuracy of position detection when the photodiode PD as a light sensor shown in FIGS. 7A and 7B or the like has sensitivity not only to non-visible light (for example IR light) but also to visible light.

Incidentally, in the first example of modification, the shadow of an object to be detected that blocks extraneous light may be detected from the output of the light sensor sections 1 and the output of the extraneous light sensors when it is determined that extraneous light intensity detected by the extraneous light sensors is somewhat high, and the presence or absence, the position, or the size of the object to be detected may be detected on the basis of a result of the detection.

<Second Example of Modification: Other Modifiable Points>

While infrared rays (IR light) are mainly used as non-visible light for the description of the foregoing embodiments and the first example of modification thereof, ultraviolet rays may be used as non-visible light.

The backlight 300 is not limited to a backlight having a light source and a light guiding member, but may be a backlight having only a light source such as a backlight having a plurality of LEDs arranged two-dimensionally, for example. In addition, the backlight 300 is not limited to a surface light source, but may be a line light source or a point light source. The light guiding member is not limited to the shape of a plate (light guide plate 302), but may be for example a long rectangular parallelepiped or a cube.

All the TFT structures including the photodiode PD, the reset transistor TS, the amplifier transistor TA, and the readout transistor TR in the readout circuit (FIGS. 5A and 5B) and the switching element SW in the pixel circuit as well as the TFD (Thin Film Diode) structure having the control gate CG may be formed as a top gate type. In this case, at least the rear side of the light receiving region of the TFD (the I-region or the D-region) and the channel forming regions of the TFTs is desirably covered with a light shielding layer so that direct light from the backlight 300 does not enter the light receiving region and the channel forming regions.

The constitution (arrangement and color types) of the pixel units shown by the filters (21R, 21G, and 21B) in FIG. 4 and adjacent position relation of the sensor opening SA corresponding to the light sensor section to the pixel units are not limited to the constitution and the adjacent position relation shown in FIG. 4.

<Third Example of Modification>

The foregoing embodiments and the first and second examples of modification are not limited to liquid crystal display devices but are widely applicable to emissive type display devices such as organic EL display devices and the like, display devices using electrophoresis applicable to electronic paper, and the like.

A display device using electrophoresis has an electronic ink between a pixel electrode and a common electrode provided to a counter substrate (transparent substrate). The electronic ink is a substitute for the liquid crystal layer 203 in FIG. 1. The electronic ink has a plurality of microcapsules including positively charged white particles and negatively charged black particles suspended in a liquid. Electrophoresis enables gradation display of a pixel according to input data by utilizing a fact that particles moving to the pixel electrode side and the common electrode side are inverted between white and black for a positive electric field and a negative electric field applied between the pixel electrode and the common electrode, and that the pixel appears to be bright as viewed from an observer when a large proportion of the white particles are moved to the transparent substrate side. Thus, the foregoing embodiments can be applied in substantially the same manner except for a method of light modulation of the liquid crystal layer 203.

On the other hand, an organic EL display device does not require the backlight 300. An organic EL display device utilizes a phenomenon in which an organic material film itself laminated in each pixel within a display panel emits light at a luminance corresponding to the magnitude of an applied electric field. Thus, a condensing lens is desirably formed by an intra-layer lens layer, for example. Otherwise, the foregoing embodiments can be applied in substantially the same manner.

<Examples of Application of Display Device to Products>

The embodiments and the first to third examples of modification can be applied as a display part for displaying characters and images in various products as follows.

Specifically, the foregoing embodiments and the first to third examples of modification can be applied to for example television receivers, monitor devices of personal computers and the like, mobile devices having a video reproducing function such as portable telephones, game machines, PDAs and the like, picture taking devices such as still cameras, video cameras and the like, and vehicle mounting devices such as car navigation systems and the like.

According to the foregoing embodiments and the examples of modification thereof, the following advantages are obtained.

A resistance type or a capacitance type touch panel having a two-layer conductive film or a thin glass, which touch panel is disposed on the front side of a display panel, is rendered unnecessary. That is, an "in-cell touch panel" having a function of a touch panel within a display panel can be realized. Thus, the display device can be miniaturized and, in particular, reduced in thickness.

Because received light data and an address of a detected position are stored in a memory as a set, a plurality of separate positions can be detected simultaneously. In addition, not only the position of an object to be detected but also the size of the object to be detected can be detected.

In a case where an illuminating section is provided, it is possible to detect an object to be detected for a while (a maximum of about one day) even after illumination is turned off while an instruction or information is being input by making an object to be detected such as a finger, a stylus pen or the like recognized, or even after an automatic turnoff function is activated in a power saving mode. In addition, operation is not hindered even in a dark because illumination can be provided by an afterglow.

In either of a case where an illuminating section is provided and a case where no illuminating section is provided, a momentary difficulty in seeing a screen when the brightness of an environment changes suddenly is prevented or alleviated by auxiliary illumination by an afterglow.

A problem of being unable to detect a finger or a stylus pen when the screen is making totally black display can be solved without a light source of detection light being added.

Because auxiliary illumination by an afterglow is possible, the illuminating section can be reduced in cost. When use is limited to a dark environment, the illuminating section itself is rendered unnecessary.

The first example of modification enables extraneous light detection based on visible light to be performed in the display region of a display device. When an extraneous light sensor is disposed within an effective display region, as compared with a system in which the extraneous light sensor is disposed outside the display region, surface luminance on the display device can be measured more accurately, and therefore accuracy of control of light emission intensity of the backlight is improved.

The display device according to the present invention described above can be applied to display devices of various electronic devices, that is, electronic devices in all fields that display a video signal input thereto or a video signal generated therein as an image or video, such for example as digital cameras, notebook personal computers, portable terminal devices such as portable telephones and the like, and video cameras.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a display section having a display surface, and capable of displaying information on said display surface; and
a light storing section capable of receiving incident light including visible light, absorbing a part of the incident light, and outputting the part of the incident light as an afterglow including non-visible light;
wherein a light sensor that is configured to detect an object to be detected adjacent a side of said display surface on a basis of a non-visible light component of output light from said light storing section is disposed within said display section, and further wherein the light storing section is formed by material located in one or more light filtering structures and further wherein the light storing material is comprised of infrared photoluminescent material which absorb ultraviolet to visible light and which emit light including infrared light.

2. The display device according to claim 1,
wherein said light storing section is disposed within said display section.

3. The display device according to claim 2,
wherein said display section includes
an illuminating section configured to produce illuminating light including visible light,
said light storing section formed by a light storing material, and capable of absorbing a part of said illuminating light, outputting remaining said illuminating light other than the absorbed said part of the illuminating light, and outputting the absorbed said part of the illuminating light as an afterglow including non-visible light,
a light modulating section configured to receive output light incident on said light modulating section from said light storing section, modulate the incident output light according to an input signal, and emit the modulated output light,
said display surface emitting, to an outside, said output light having said information added to said output light by being modulated by said light modulating section, and the light sensor configured to detect non-visible light from reflected light resulting from said output light being reflected by the object to be detected on the side of said display surface.

4. The display device according to claim 3,
wherein said illuminating section includes
a light source, and
a light guide plate configured to convert light from said light source into said illuminating light in a plane shape,
said illuminating section is disposed on an anti-display surface side of said display section, and
said light storing section is formed between a side of said illuminating section and said light modulating section.

5. The display device according to claim 2,
wherein said display section includes
said display surface,
said light storing section formed by a light storing material, and capable of absorbing a part of extraneous light incident on said light storing section from said display surface, outputting remaining said extraneous light, and outputting the absorbed said part of the extraneous light as an afterglow including non-visible light, a reflecting surface for reflecting output light from said light storing section to emit the output light from said display surface to an outside, a light modulating section configured to modulate said output light according to an input signal in an optical path in a mid course of said output light from said light storing section being reflected by said reflecting surface and emitted from said display surface, and the light sensor configured to detect non-visible light from reflected light resulting from the output light from said light storing section being reflected by the object to be detected on the side of said display surface.

6. The display device according to claim 2, wherein in said display section, a plurality of pixel regions configured to dispose a pixel and a plurality of sensor regions configured to dispose said light sensor are determined regularly as viewed from said display surface, and said light storing section is formed in each of said pixel regions.

7. The display device according to claim 6, wherein said non-visible light is infrared light, said light sensor is an infrared light sensor having sensitivity to the infrared light, and said light storing section is formed by making a red light transmitting filter contain a light storing material.

8. The display device according to claim 2, wherein in said display section, a plurality of pixel regions configured to dispose a pixel and a plurality of sensor regions configured to dispose said light sensor are determined regularly as viewed from said display surface, and said light storing section is formed in each of said sensor regions.

9. The display device according to claim 1, further comprising a stylus pen having said light storing section in a region including a tip as an accessory.

10. The display device according to claim 9, wherein said display section includes an illuminating section configured to produce illuminating light including visible light, a light modulating section configured to receive said illuminating light incident on the light modulating section, modulate the incident illuminating light according to an input signal, and emit the modulated illuminating light, and said display surface for emitting said illuminating light modulated by said light modulating section to an outside.

11. A display device comprising:

display means having a display surface, and capable of displaying information on said display surface; and light storing means capable of receiving incident light including visible light, absorbing a part of the incident light, and outputting the part of the incident light as an afterglow including non-visible light;

wherein a light sensor configured to detect an object to be detected on a side of said display surface on a basis of a non-visible light component of output light from said light storing means is disposed within said display means, and further wherein the light storing section is formed by material located in one or more light filtering structures and further wherein the light storing material is comprised of infrared photoluminescent material which absorb ultraviolet to visible light and which emit light including infrared light.

\* \* \* \* \*